United States Patent
Chari et al.

(10) Patent No.: US 9,848,384 B2
(45) Date of Patent: Dec. 19, 2017

(54) RECEIVER DEACTIVATION BASED ON DYNAMIC MEASUREMENTS

(71) Applicant: Imagination Technologies, Limited, Kings Langley (GB)

(72) Inventors: Sujai Chari, Burlingame, CA (US); Meesaraganda Surendra Raju, Bangalore (IN)

(73) Assignee: Imagination Technologies (GB)

( * ) Notice: Subject to any disclaimer, the term of this patent is extended or adjusted under 35 U.S.C. 154(b) by 3 days.

(21) Appl. No.: 15/041,316

(22) Filed: Feb. 11, 2016

(65) Prior Publication Data

US 2017/0238255 A1  Aug. 17, 2017

(51) Int. Cl.
| | |
|---|---|
| H04W 52/02 | (2009.01) |
| H04L 1/00 | (2006.01) |
| H04L 5/00 | (2006.01) |
| H04L 1/20 | (2006.01) |

(52) U.S. Cl.
CPC ....... *H04W 52/0229* (2013.01); *H04L 1/0042* (2013.01); *H04L 1/0045* (2013.01); *H04L 1/0053* (2013.01); *H04L 1/0054* (2013.01); *H04L 1/20* (2013.01); *H04L 5/0007* (2013.01)

(58) Field of Classification Search
CPC . H04W 52/0229; H04L 1/0046; H04L 1/0047
See application file for complete search history.

(56) References Cited

U.S. PATENT DOCUMENTS

| | | |
|---|---|---|
| 7,593,378 B1 | 9/2009 | Murali et al. |
| 2001/0008430 A1 | 7/2001 | Carr et al. |
| 2005/0032514 A1 | 2/2005 | Sadri et al. |
| 2006/0109923 A1 | 5/2006 | Cai et al. |
| 2006/0234715 A1 | 10/2006 | Cho et al. |
| 2007/0049990 A1* | 3/2007 | Klostermann ..... A61N 1/37252 607/60 |
| 2007/0211641 A1* | 9/2007 | Fu ............................ H04L 1/203 370/241 |
| 2008/0063097 A1 | 3/2008 | Horiuchi et al. |
| 2009/0279498 A1 | 11/2009 | Li et al. |

(Continued)

FOREIGN PATENT DOCUMENTS

| | | |
|---|---|---|
| WO | WO 2007/069210 | 6/2007 |
| WO | WO 2011/044959 | 4/2011 |

OTHER PUBLICATIONS

Loyka, Receiving wireless signals with multiple diversity-Freq selectivity and delay spread, Oct. 2012.*

(Continued)

*Primary Examiner* — Wesley Kim
*Assistant Examiner* — Dong-Chang Shiue
(74) *Attorney, Agent, or Firm* — Brian R. Short

(57) ABSTRACT

Apparatuses, methods, apparatuses, and systems for of selectively deactivating portions of a receiver based on dynamic measurements are disclosed. One embodiment of a method includes receiving, by the receiver, a wireless signal, identifying a packet within the wireless signal, determining whether the packet cannot be decoded with a reliability greater than a threshold, and powering down at least a portion of the receiver after determining that the packet cannot be decoded with the reliability greater than the threshold.

16 Claims, 20 Drawing Sheets

(56) References Cited

U.S. PATENT DOCUMENTS

| | | |
|---|---|---|
| 2010/0008400 A1* | 1/2010 | Chari .................. H04B 1/7156 |
| | | 375/137 |
| 2010/0223524 A1 | 9/2010 | Duggan et al. |
| 2010/0296389 A1 | 11/2010 | Khandekar et al. |
| 2011/0103497 A1 | 5/2011 | Wilhelmsson et al. |
| 2013/0010964 A1 | 1/2013 | Fong et al. |
| 2013/0016639 A1 | 1/2013 | Xu et al. |
| 2013/0039303 A1 | 2/2013 | Stadelmeier et al. |
| 2013/0053082 A1 | 2/2013 | Chai et al. |
| 2013/0100846 A1 | 4/2013 | Park et al. |
| 2013/0201834 A1 | 8/2013 | Klingenbrunn et al. |
| 2013/0322340 A1 | 12/2013 | Nishio et al. |
| 2013/0344911 A1 | 12/2013 | Yu |
| 2014/0036818 A1* | 2/2014 | Koskela .............. H04W 72/042 |
| | | 370/329 |
| 2014/0112229 A1 | 4/2014 | Merlin et al. |
| 2014/0254701 A1* | 9/2014 | Geirhofer ............ H04B 7/0626 |
| | | 375/267 |
| 2014/0293818 A1 | 10/2014 | Sesia et al. |
| 2014/0321682 A1 | 10/2014 | Kofod-Hansen et al. |
| 2015/0103714 A1* | 4/2015 | Lee .................. H04W 52/0222 |
| | | 370/311 |
| 2015/0171937 A1 | 6/2015 | Murakami et al. |
| 2015/0319787 A1 | 11/2015 | Ling |
| 2016/0037486 A1 | 2/2016 | Wentzloff et al. |

OTHER PUBLICATIONS

Extended European Search Report, dated Jun. 16, 2017, Application No. 17154047.9—1875.

* cited by examiner

RECEIVER DEACTIVATION BASED ON DYNAMIC MEASUREMENTS

FIELD OF THE DESCRIBED EMBODIMENTS

The described embodiments relate generally to wireless communications. More particularly, the described embodiments relate to systems, methods and apparatuses for selectively deactivating portions of a receiver based on dynamic measurements.

BACKGROUND

Wireless communications between mobile devices and access nodes include wireless links between the mobile devices and the access nodes that typically vary over time. For example, typically the link capacity of the wireless links vary over time based on many dynamic factors such as mobility of transmitter/receiver of the mobile device, moving blockers (e.g. people, doors), and interference. Even when a transmitter makes a best estimate for the data rate and modulation to use for transmission of a given packet of the wireless communication, there is no guarantee that a receiver can reliably decode/receive the packet.

During situations in which error free decoding is not possible for a given packet, the PHY (Physical) layer of the receiver decodes the full packet and typically passes the bits to the MAC (Media Access Control) layer, which then determines that the bits are in error (for example, by performing a CRC (Cyclic Redundancy Check).

It is desirable to have methods apparatuses, and systems for selectively deactivating portions of a receiver based on dynamic measurements for saving processing power.

SUMMARY

An embodiment includes a receiver, wherein the receiver includes a radio frequency (RF) chain operable to receive a wireless signal, and signal processing circuitry. The signal processing circuitry is operative to identify a packet within the wireless signal, and determine whether the packet cannot be decoded with a reliability greater than a threshold. Further, the receiver is operative to power down at least a portion of the receiver after determining that the packet cannot be decoded with the reliability greater than a threshold.

Another embodiment includes a method of selectively deactivating portions of a receiver based on dynamic measurements. The method includes receiving, by the receiver, a wireless signal, identifying a packet within the wireless signal, determining whether the packet cannot be decoded with a reliability greater than a threshold, and powering down at least a portion of the receiver after determining that the packet cannot be decoded with the reliability greater than the threshold.

There may be provided a non-transitory computer readable storage medium having stored thereon computer readable instructions that, when executed at a computer system, cause the computer system to perform the described method.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods apparatuses, and systems for selectively deactivating portions of a receiver based on dynamic measurements for saving processing power. Further, at least some of the described embodiments include selectively activating portions of the receiver based on the dynamic measurements. Receiver processing of packets in error consumes extra power that could be saved if the receiver could detect in advance or at least after receiving a portion of the packet that error free decoding is not possible and shut down the various receiver components/blocks to save power.

At least some embodiments include identifying and monitoring wireless signal reception metrics during the processing of early stages (earlier portions) of a received packet of a received wireless signal to determine with a high degree of certainty whether the packet can be decoded error-free. If the determination is made that the packet cannot be decoded reliably (or error-free), the receiver (or at least portions of the receiver) can be shut down for the duration of the packet (or until the expected arrival of the next packet if available). Shutting down or powering down portions of the receive saves power. That is, by using metrics that predict with a high degree of accuracy whether or not a packet can be reliably decoded, the described embodiments provide early shutdown of a receiver for packets that cannot be properly decoded thereby resulting in a substantial savings in power consumption over devices that do not deploy such a method for early shutdown. Further, for at least some embodiments, the information (metrics) used to determine packet aborts is shared among wireless access nodes in a cooperative wireless network that could lead to better routing and overall improved throughput/efficiency of the wireless network. While the described embodiments include selectively powering down portions of the receiver, an alternate embodiment includes selectively powering up portions of the receiver.

Figure 1A:
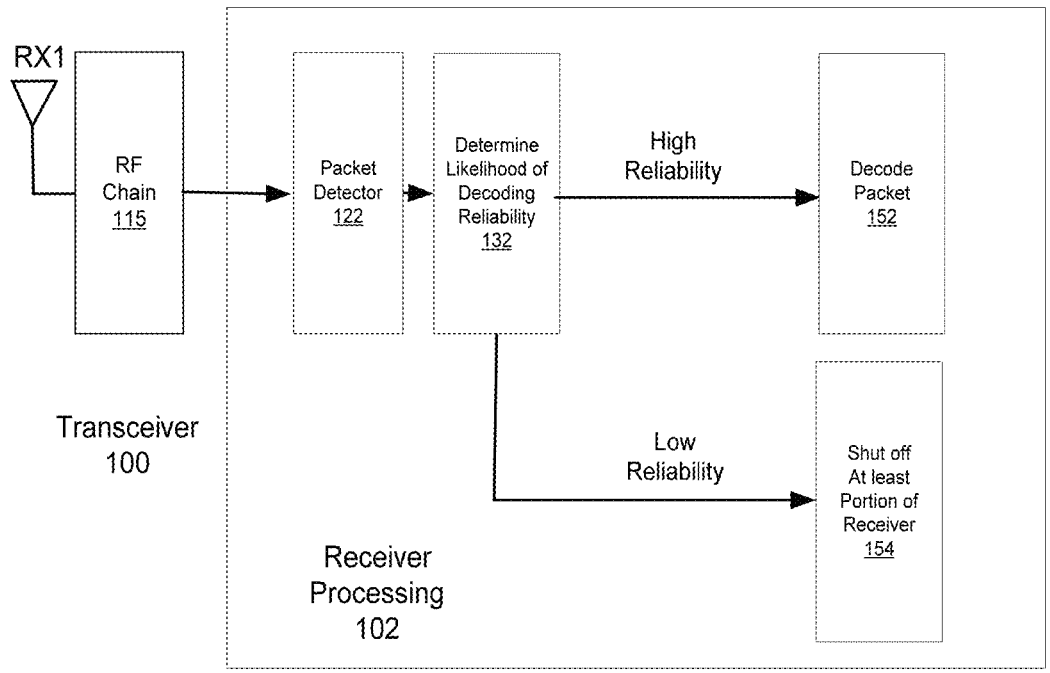
FIG. 1A shows a receiver portion of a transceiver that includes selective deactivating/activating portions of a receiver based on dynamic measurements for saving processing power, according to an embodiment.

FIG. 1A shows a receiver portion of a transceiver 100 that includes selective deactivating/activating portions of a receiver 102 based on dynamic measurements for saving processing power, according to an embodiment. As shown, the transceiver 100 includes a receiving antenna (RX1) connected to an RF chain 115 which receive and demodulate wireless signals. A packet detector 122 detects packets within the demodulated wireless signals. A processing block 132 determines a likelihood of decoding reliability of the detected packets.

For an embodiment, the determination (block 132) of the decoding reliability of the detected packets generates an output that indicates the reliability is greater than a predetermined threshold (high reliability). If the reliability is determined to be greater than the predetermined threshold, the packets are decoded (152).

For an embodiment, the determination (block 132) of the decoding reliability of the detected packets generates an output that indicates the reliability is less than the predetermined threshold (high reliability). If the reliability is determined to be less than the predetermined threshold, the packets are not decoded, and at least portions of the received decoding circuitry is turned off or deactivated (154), thereby saving processing power of the transceiver 100.

While the described embodiment only includes a single predetermined threshold, it is to be understood that there can be multiple thresholds, wherein more or less processing circuitry is activated or deactivated based upon how reliable the decoding of the packets is determined to be.

The ability to decipher the likelihood of successful decoding of a packet is integral to managing power consumption of the receiver. For at least some embodiments, when the likelihood of decoding is determined to be less than the predetermined threshold, the receiver and/or associated circuitry is placed in deep sleep or standby mode if there is a priori information that there is no anticipated data/packets that the receiver and/or associated circuitry must receive for a reasonable duration of time. For an embodiment, the reasonable duration is a duration of time that is considerably greater than an expected wake times of the various components of the receiver when the receiver must attempt to receive any packets. If more packets are expected to be received within a duration of time on the order of (or less than) the wake time of the receiver, then upon determining that the likelihood of decoding of the current packet is less than the predetermined threshold, portions of the receiver can be placed in sleep mode and only the portion of the receiver that is needed to determine the start of a packet would be left in active mode. When the start of a subsequent packet is detected, other receiver blocks could be powered on as needed based on the processing flow as determined by the receiver's state machine.

Figure 1B:
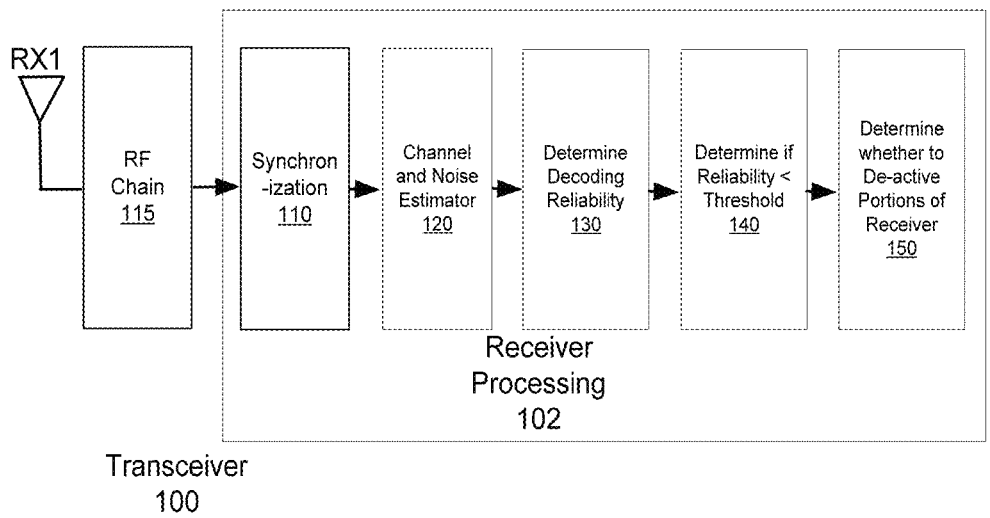
FIG. 1B shows a receiver portion of a transceiver that includes selective deactivating/activating portions of a receiver based on dynamic measurements for saving processing power, according to an embodiment.

FIG. 1B shows a receiver portion of a transceiver that includes selective deactivating/activating portions of a receiver 102 based on dynamic measurements for saving processing power, according to an embodiment. The transceiver includes a radio frequency (RF) chain operable to receive a wireless signal. Further, the receiver includes signal processing circuitry operative to identify a packet within the wireless signal, and determine whether the packet cannot be decoded with a reliability greater than a threshold (140). The receiver is further operative to power down at least a portion of the receiver (150) after determining that the packet cannot be decoded with a reliability greater than a threshold.

For at least some embodiments, the synchronization block 110 determines the start of a valid packet and the symbol boundaries within the packet. The channel and noise estimation block 120 estimates the channel response of the signal and the noise power. Based on these measurements, the SNR (signal to noise ratio) is determined which reflects the link and signal quality. Using the SNR and the knowledge of the modulation and coding used on the transmitted signal (which can be obtained from decoding portions of the preamble like the preamble header), a highest data rate can be determined to be received reliably above the threshold. If the data rate for the payload portion of the packet exceeds the aforementioned highest data rate, then the reliability is likely to be less than the threshold. Therefore, the receiver may shut down portions of the receiver that are needed for processing the payload. For an embodiment, these portions (the portions of the receiver that are shut down) are subsequently placed in active mode when a packet is received that can be decoded successfully with likelihood greater than the reliability threshold. If there is a priori information that no subsequent traffic is expected for the transceiver for a duration of time, for at least some embodiments, the whole receiver is placed into sleep or standby mode until the subsequent traffic is expected. At that time, the RF chain and synchronization blocks can be activated to determine the valid start of packet. Upon successful detection of the start of packet, the remaining portions of the receiver can be activated as the need arises based on further preamble and payload processing.

For an embodiment, the receiver includes signal processing circuitry operative to identify a packet within the wireless signal, determine whether the packet can be decoded with a reliability greater than a threshold, and power at least a portion of the receiver after determining that the packet cannot be decoded with the reliability greater than the threshold.

For at least some embodiments, upon receiving a wireless signal, synchronization is performed by the receiver to determine a packet boundary of the received signal. For example, a Synchronization Block 110 of a transceiver 100 in FIG. 1 shows the process of synchronizing and determining a packet boundary. Next, based on knowledge of the transmitted signals, the receiver estimates the channel and noise for the received signal as shown in a Channel and Noise Estimator block 120 of FIG. 1.

Typically, in wireless systems, training symbols are transmitted to aid estimation of the channel. For example, in OFDM based WLAN systems, training symbols are transmitted on every sub-carrier to facilitate estimation of the channel response for all the sub-carriers. By using represent $X[k]$ to represent a training symbol on the $k^{th}$ sub-carrier, and $H[k]$ the channel gain on the $k^{th}$ sub-carrier, then the received training signal $Y[k]$ can be represented as, $$Y = \begin{bmatrix} Y[0] \\ Y[1] \\ \dots \\ Y[N-1] \end{bmatrix}$$

$$= \begin{bmatrix} X[0] & 0 & \dots & 0 \\ 0 & X[1] & \dots & 0 \\ \dots & \dots & \dots & \dots \\ 0 & 0 & \dots & X[N-1] \end{bmatrix} \begin{bmatrix} H[0] \\ H[1] \\ \dots \\ H[N-1] \end{bmatrix} + \begin{bmatrix} W[0] \\ W[1] \\ \dots \\ W[N-1] \end{bmatrix}$$

$$= XH + W$$

Where, H is the channel gain vector and W is the noise vector and $\mathrm{var}\{W[k]\}=\sigma^2$. Since, the training symbol is known at the receiver, many techniques can be used to estimate the channel response. For example, a simple Least Square(LS) estimate is derived as, $$\hat{H}_{LS} = X^{-1}Y$$

$$\hat{H}_{LS}[k] = \frac{Y[k]}{X[k]}$$

Likewise, the noise variance, $\sigma^2$ can be estimated using a variety of techniques. One technique is to measure the mean value of $\|Y-X\hat{H}\|^2$. Another technique is to use the knowledge of the front-end gains of the Receiver to estimate the noise power.

From the above the SNR is estimated as;

$$SNR_{est} = \frac{E\{\|\hat{H}X\|^2\}}{\hat{\sigma}^2}.$$

Using the channel and noise, an SNR for the received signal can be determined. SNR is one measure of signal quality, however, other possible signal quality measures can additionally or alternatively be used. As shown in the Determine Decoding Reliability block 130 of FIG. 1, a measure of decoding reliability may be used to assess the quality of the received signal.

While the processing blocks of FIG. 1 are shown separately, it is to be understood that this is for ease of description, and that the functional processing can be represented and implemented in alternate forms.

For at least some embodiments, the packet includes convolutional encoding. Further, processing of the payload includes Viterbi decoding the payload, monitoring path metrics during the Viterbi decoding, and determining that the packet cannot be decoded with the reliability of greater than the threshold when analysis of the path metrics indicates likelihood of decoding errors. For an embodiment, for packets that use convolutional encoding, the Viterbi decoder path metrics can be monitored to see if lowest path metrics exceed a threshold which could be likely indication of decoding error.

The evolution of the path metrics can provide interesting insights into the nature of the channel or signal quality and this fact can be exploited in determining if the packet can be reliably decoded or not. Since, the Viterbi algorithm computes the distance between a likely code word and the received data, the distance can be used as a metric to indicate signal quality. In this regard, the cumulative sum of the minimum path metric during the decoding process is a candidate metric for signal quality estimation. If the cumulative minimum path metric is beyond a pre-determined threshold, a low quality signal can be inferred necessitating aborting further processing. The pre-determined threshold may be a function of the data rate, constellation size, and coding scheme. Lower size constellations with strong coding can tolerate more noise and hence a higher pre-determined threshold would be used compared to larger constellations with weak coding.

In general, the Viterbi decoder implementation incorporates normalization techniques owing to fixed point limitations, due to which the cumulative minimum path metric may not be very useful. However, in WLAN applications where smaller length Headers are convolutionally encoded, the cumulative minimum path metric at the end of Header decoding could be a reliable measure of the signal quality.

To alleviate the disadvantages of the cumulative minimum path metric previously described, other metrics can be considered, including monitoring the spread of the path metric computed as the average difference between the maximum and minimum path metrics. A lower spread indicates a low quality signal necessitating aborting further processing. Further, in certain channels, monitoring the average difference of the minimum and the second minimum is a good indicator of the signal quality. Further, in typical Viterbi decoder implementations that incorporate metric normalizations, a good indicator of signal quality is the number of times the minimum path metric went beyond a threshold necessitating a normalization of all the path metrics.

Figure 2:
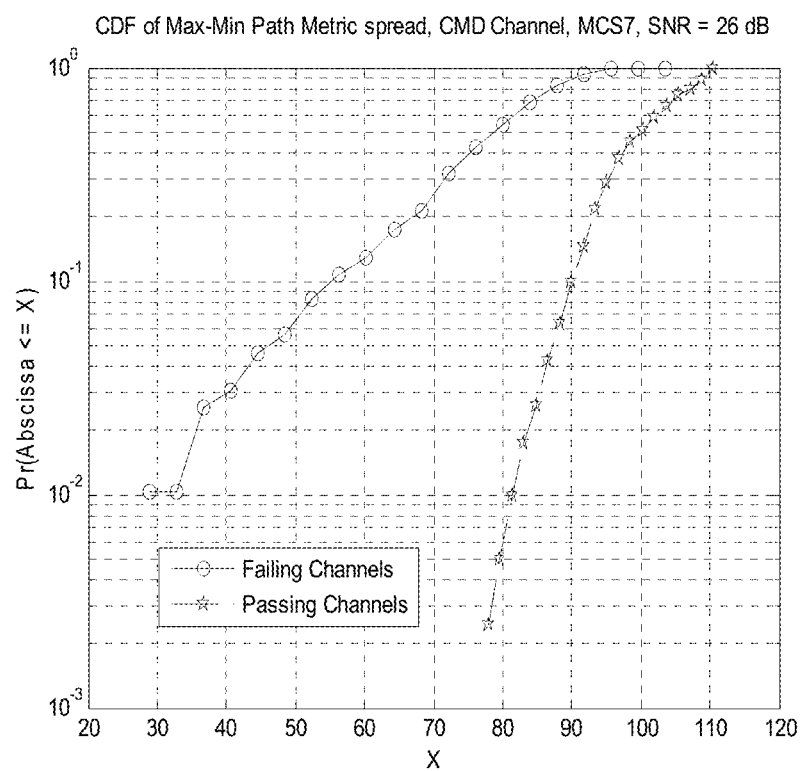
FIG. 2 illustrates a distribution of the maximum/minimum path metric spread for cases in which the packets were decoded successfully (denoted as passing channels) and the packets that were not decoded successfully (denoted as failing channels) for MCS (modulation and coding scheme) 7 with SNR (signal to noise ratio) of 26 dB, according to an embodiment.

FIG. 2 illustrates a distribution of the maximum/minimum path metric spread for cases where the packets were decoded successfully (denoted as passing channels) and the packets that were not decoded successfully (denoted as failing channels) for MCS 7 with SNR of 26 dB, according to an embodiment. As evident from the plot, the larger the max/min spread, the more likely that the packet can be decoded successfully. Thus, a threshold such as 75 could be chosen for the max/min spread threshold. If/when the spread falls below this threshold during the packet, as evident from the plot, it is almost certainly a failing case as the smallest spread with a possibility of being a passing case is around 78. Thus, when the max/min path metric spread falls below the threshold, the packet can be aborted and portions of the receiver turned off or placed in sleep mode to save power for at least the remaining duration of the packet.

Figure 3:
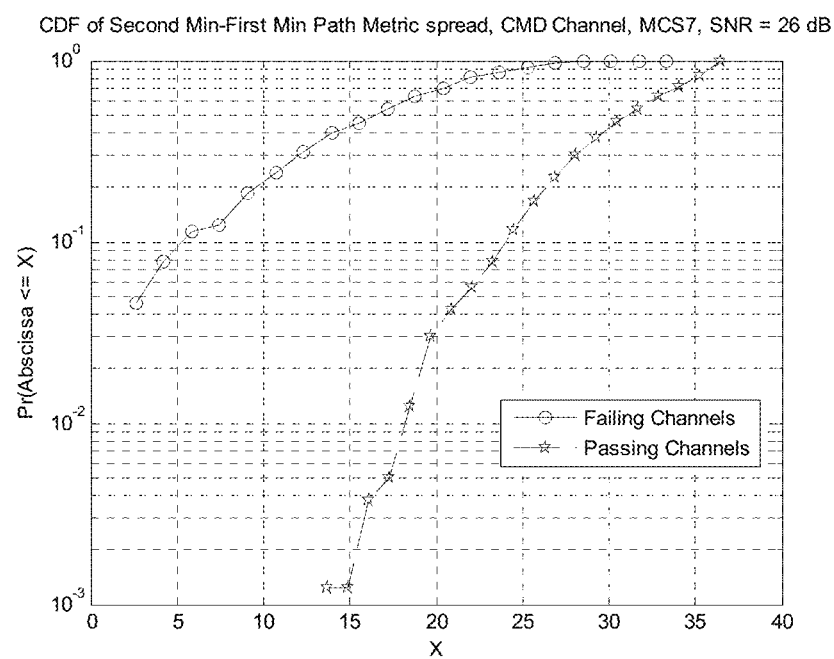
FIG. 3 illustrated CDFs (cumulative distribution functions) for passing and failing cases for a slightly different metric, the second minimum to lowest (or first) minimum path metric spread for MCS 7 with an SNR of 26 dB, according to an embodiment.

FIG. 3 illustrated CDFs for passing and failing cases for a slightly different metric, the second minimum to lowest (or first) minimum path metric spread for MCS 7 with an SNR of 26 dB, according to an embodiment. As evident from the plot, the larger the second to first minimum path metric spread, the more likely that the packet can be decoded successfully. Thus, a threshold such as 15 could be chosen for the $2^{nd}/1^{st}$ minimum spread threshold. If/when the spread falls below this threshold during the packet, as evident from the plot, it is almost certainly a failing case as the smallest spread with a possibility of being a passing case is around 15. Thus, when the $2^{nd}/1^{st}$ min path metric spread falls below the threshold, the packet can be aborted and portions of the receiver turned off or placed in sleep mode to save power for at least the remaining duration of the packet.

Figure 4:
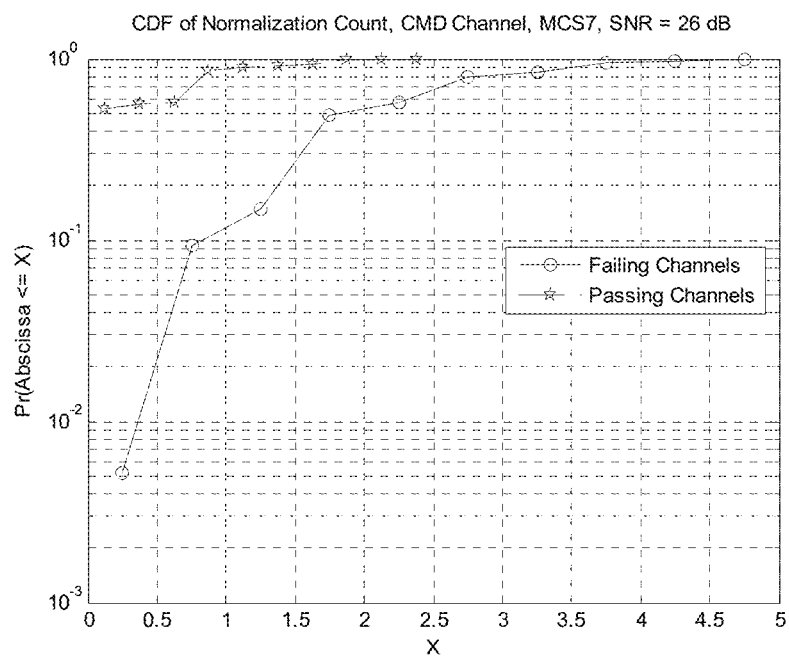
FIG. 4 illustrated CDFs for passing and failing cases for another metric, the normalization count for MCS 7 with an SNR of 26 dB, according to an embodiment.

FIG. 4 illustrated CDFs (cumulative distribution functions) for passing and failing cases for another metric, the normalization count for MCS (modulation and coding scheme) 7 with an SNR of 26 dB, according to an embodiment. The normalization count is a count of the number of times normalization of all path metrics was required when the minimum path metric exceeded some threshold. As evident from the plot, the larger the normalization count, the more likely that the packet cannot be decoded successfully. Thus, a threshold such as 2 could be chosen for the normalization count threshold. If/when the count exceeds this threshold during the packet, as evident from the plot, it is almost certainly a failing case. Thus, when the normalization count exceeds the threshold, the packet can be aborted and portions of the receiver turned off or placed in sleep mode to save power for at least the remaining duration of the packet.

At least some embodiments further include determining a priori characteristics of the wireless signal, measuring the characteristics during the preamble, and determining that the packet cannot be decoded with the reliability of greater than the threshold when the measured characteristics fall outside an expected range based on the a priori characteristics.

For at least some embodiment, when the packet is expected from a known transmitter (with which prior communication has occurred), certain characteristics of the signal may be known a priori. Some examples include expected carrier/timing offset, data rate (e.g. beacon packet), RSS (within some expected range). If these parameters/statistics are measured during the early portion of the packet and fall outside the expected range, then the packet could be aborted since the signal is likely a packet from an alien device and not intended for the receiver.

The carrier/timing offset between a transmitter and receiver is typically within some boundary. For WiFi (wireless fidelity) devices operating in the 2.4 GHz spectrum, the clock sources used for generating the DAC/ADC clocks and the carrier frequencies must be within +/−25 ppm (parts per million) of the nominal values. Thus, the maximum expected difference between a pair of devices (that is, a transmitter and a receiver) is 50 ppm. Once this difference has been estimated by a receiver, the main source of change to this value would be due to temperature changes at each device relative to when the estimate was obtained. However, the temperature change is typically gradual and the carrier/timing offsets can be periodically updated and stored to track the latest carrier/timing offset.

If a receiver receives a packet from a different device than the aforementioned desired transmitter, the clock offset is a random value within the 0 to 50 ppm range. Since the clock offset is reasonably accurately maintained with the desired device (for example, to an accuracy of +/−2 ppm), then if a clock offset is estimated during the preamble of the received packet that falls outside of the uncertainty of the clock offset of the desired transmitter, then the source of the transmission is likely an alien device. Thus, the packet processing may be stopped and portions of the receiver could be shut down at least for a known duration of the packet.

For the case, where a receiver is only expecting to receive beacons from an access point (AP), the data rate is typically expected to be one of the lowest data rates. Thus, if during the decoding of the header signal, it is determined that the data rate of the payload is higher than the highest expected beacon data rate, the payload of the packet does not need to be decoded and portions of the receiver could be shut down at least for a known duration of the packet.

If a receiver is part of a device that is static and is communicating with another device such as an AP (access point) that is also static, then the received signal strength (RSS) of transmission from the AP to the receiver is likely to be within some expected range. The range is especially small if the link is unlikely to be obstructed by moving objects, people, etc. The RSS would then likely just be a function of the distance and static obstructions (like walls). Based on measurements over an interval of time, the mean and standard deviation of the RSS could be determined. The mean and standard deviation could be updated over time in case the environment changes affects the static assumptions mentioned above. The receiver can filter out packets that are received with RSS which is not within one or two standard deviations of the mean RSS. By filtering out such packets from alien devices, portions of the receiver can remain in sleep or standby mode and only used for receiving traffic from the known AP.

Figure 5:
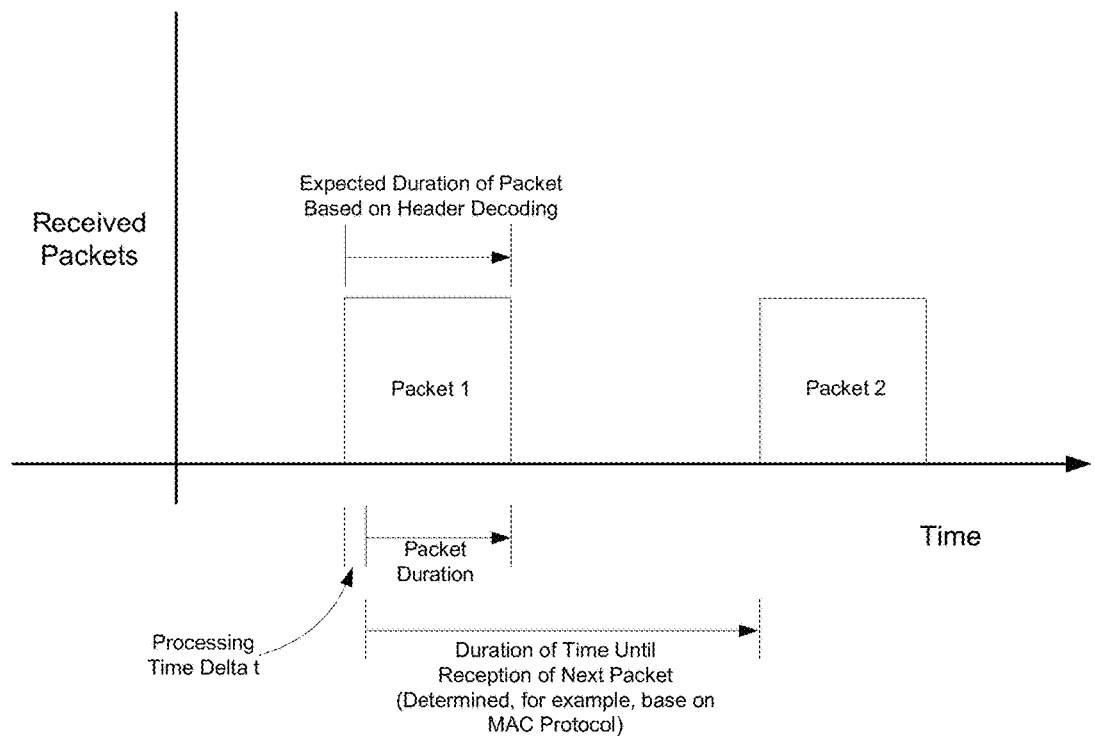
FIG. 5 shows a time-line of received packets, and possible deactivation times of at least portions of the receiver, according to an embodiment.

FIG. 5 shows a time-line of received packets, and possible deactivation times of at least portions of the receiver, according to an embodiment. As shown, two exemplary received packets (Packet 1, Packet 2) are received. For at least some embodiments, the packets include headers which can be processed to determine a time duration of the received packet (Packet Duration). After a period of time (Processing time delta t) required to process the header of the received packet, depending upon determined packet decoded reliability, at least some embodiments include powering down at least a portion of the receiver for an expected duration of the packet. For at least some embodiments, the header specifies the packet length along with modulation and coding used on the transmitted signal. Based on this information, the time duration of the payload of the current packet can be determined.

For at least some embodiments, headers of the packets are processed to determine a duration time until reception of the next packet. After the period of time (Processing time delta t) required to process the header of the received packet, depending upon determined packet decoded reliability, at least some embodiments include powering down at least a portion of the receiver until reception of the next packet.

For at least some embodiments, if a device is only intending to receive beacons from a known AP, the receiver can estimate the expected time of the next packet based on the known nominal interval between transmission of beacon packets. Since the timer at each device is based on a local clock, there could be timing drift between the expected transmission of a next beacon packet and the actual arrival of the next beacon packet. However, the receiver can estimate the worst case timing drift and start synchronization slightly prior to the nominal expected time of the next beacon packets. In some situations, the receiver may only be required to receive some fraction of beacon packets in which case the duration of time that portions of the receiver could be shut down would be even longer.

Figure 6:
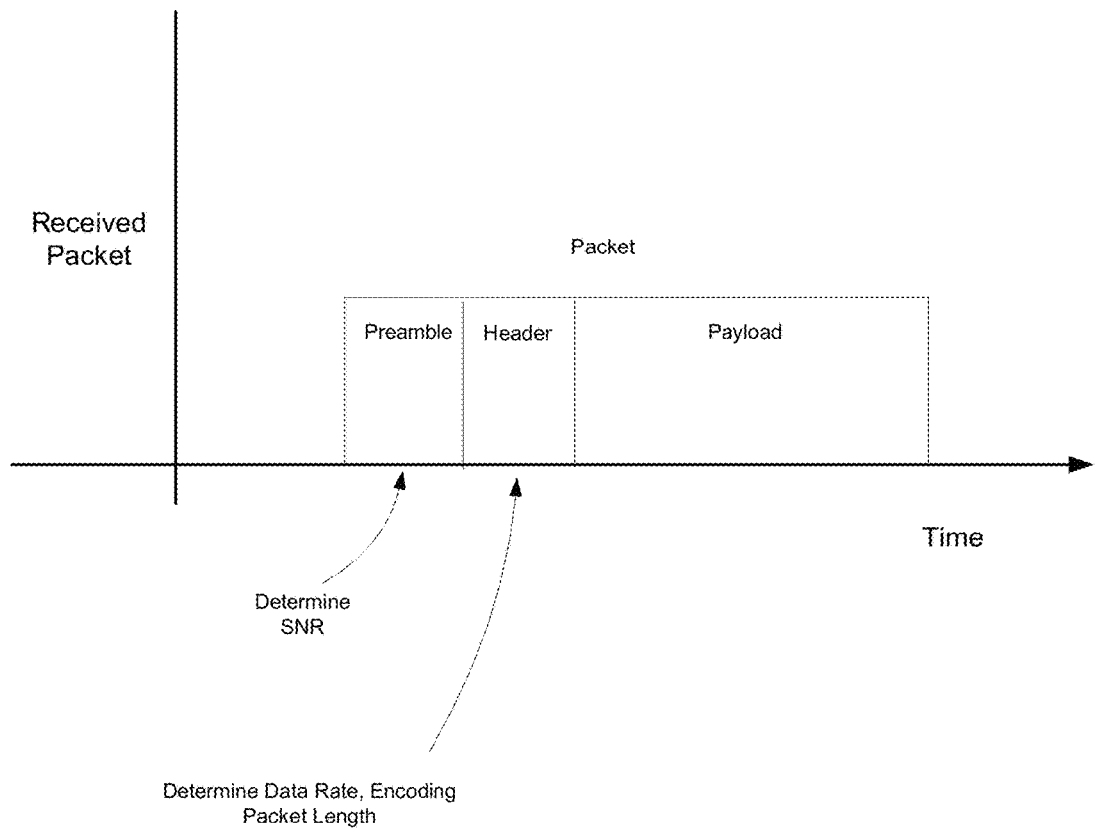
FIG. 6 shows a received packet, and portions of the received packet, according to an embodiment.

FIG. 6 shows a received packet, and portions of the received packet, according to an embodiment. As shown, the received packet of FIG. 3 includes a preamble portion, a header portion, and a payload portion. For at least some embodiments, identifying the packet includes identifying the preamble of the received packet. For at least some embodiments, identifying the packet includes identifying the header of the packet. For at least some embodiments, identifying the packet includes identifying the payload of the packet.

For at least some embodiments, the SNR of the received packet of the received wireless signal is determined during the preamble. For at least some embodiments, at least the data rate and the encoding packet length of the received packet of the received wireless signal is determined during the header.

At least some embodiments include decoding a header field of the header during the preamble to determine a data rate and a payload length for a payload portion of the packet. Further, at least some embodiments include estimating an SNR (signal to noise ratio) for the packet based on preamble fields using channel and noise estimations. Further, at least some embodiments include determining whether the estimated SNR is sufficient to allow for decoding of the data rate for the determined payload length. The required SNR to decode a packet with a target probability of error varies as a function of the data rate and the payload length. Higher data rates (which corresponds to larger constellations and in some cases weaker codes) and longer payload lengths require higher SNR in order to ensure successful decoding. The required SNR is also a function of the wireless channel characteristic. For instance, if the coding on a transmitted signal is weak (e.g. 5/6 rate convolutional code with 64 QAM constellation), the required SNR can be considerably higher for a highly dispersive NLOS (non-line-of-sight) channel compared to an LOS (line-of-sight) channel with low dispersion.

Figure 7:
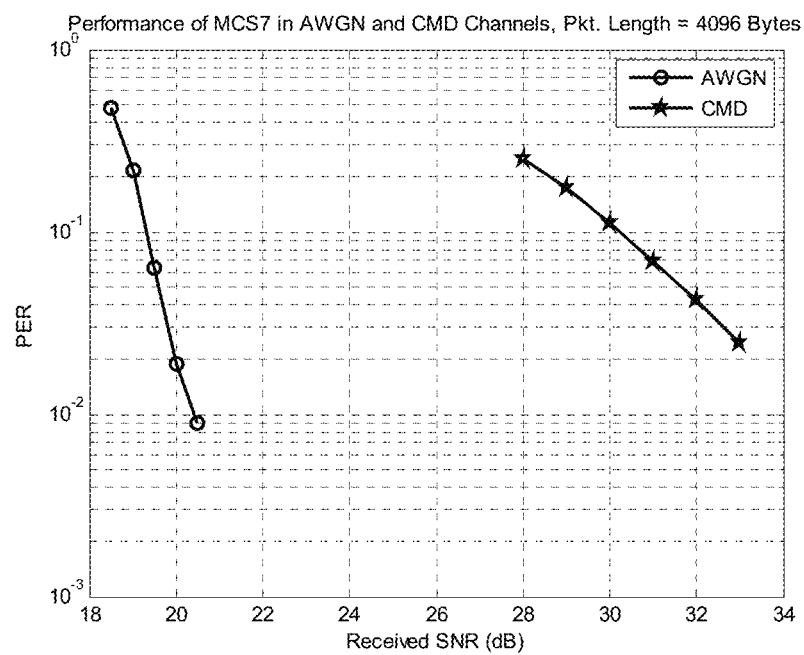
FIG. 7 shows the different SNR requirements for an AWGN (average white Gaussian noise) and NLOS (non-line-of-sight) channel, according to an embodiment.

FIG. 7 shows the different SNR requirements for an AWGN and NLOS (non-line of site) channel, according to an embodiment. If the SNR is greater than 21 dB, then for an AWGN channel, an MCS (modulation and coding scheme) 7 packet can be received reliably (that is, the probability of packet error is <1%). However, if an NLOS channel is present with CMD characteristics, the required SNR is greater than 33 dB. Thus, if the channel is determined to be AWGN or LOS, the required SNR threshold for processing the packet would be considerably lower than for an NLOS channel.

Figure 8:
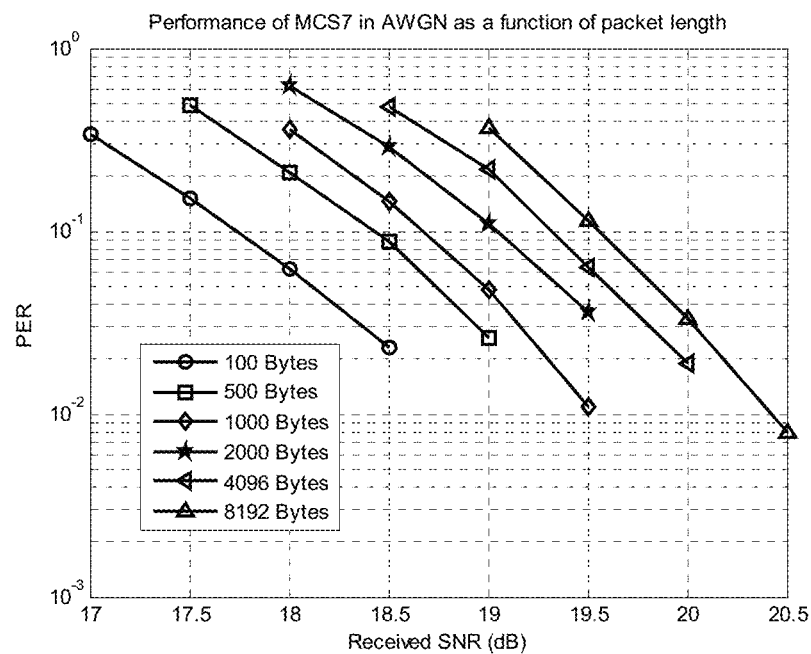
FIG. 8 shows a probability of decoding error as the payload length increases, according to an embodiment.

FIG. 8 shows a probability of decoding error as the payload length increases, according to an embodiment. As the payload length increases, the probability of decoding error also increases. At least some embodiments include a lookup table to determine the required SNR for various payload lengths and interpolation is used to determine the required SNR for payload lengths not corresponding to an entry in the table. Alternatively, since the required SNR is an approximation, for at least some embodiments, some margin is built in by using the lowest payload length listed in the table that is higher than the payload length of the current packet.

The following table provides the required SNR for a 10% PER for MSC 7 in an AWGN channel for various packet length.

| Packet Length (Bytes) | Required SNR (dB) for 10% PER for MCS7 |
|---|---|
| 100 | 17.72 |
| 500 | 18.42 |
| 1000 | 18.67 |
| 2000 | 19.04 |
| 4096 | 19.31 |
| 8192 | 19.56 |

At least some embodiments include determining statistics of a channel the wireless signal propagated before being received. Further, at least some embodiments further include determining whether the statistics of the channel allow for error free decoding of a specified modulation and the determined payload length. For at least some embodiments, in addition to SNR, the statistics of channel of a signal (e.g. frequency selectivity, RMS delay spread) can be used to determine whether error free decoding is possible for a specified modulation and payload length.

In many applications such as OFDM based WLAN, characterizing the channel response in frequency domain can be useful in ascertaining the quality of the channel and thereby determining if successful demodulation is possible or not. For example, in good channels, the magnitude response is mostly flat while in worst channels, there is a larger magnitude variation across frequency (sub-carriers). Some metrics that can be used to classify channels include a ratio of maximum to minimum magnitude response. For benign channels, the ratio of maximum to the minimum magnitude response would be smaller compared to bad channels. Another metric that can be used includes counting the number of sub-carriers whose magnitude responses are within +/−X dB of the mean magnitude response.

Figure 9:
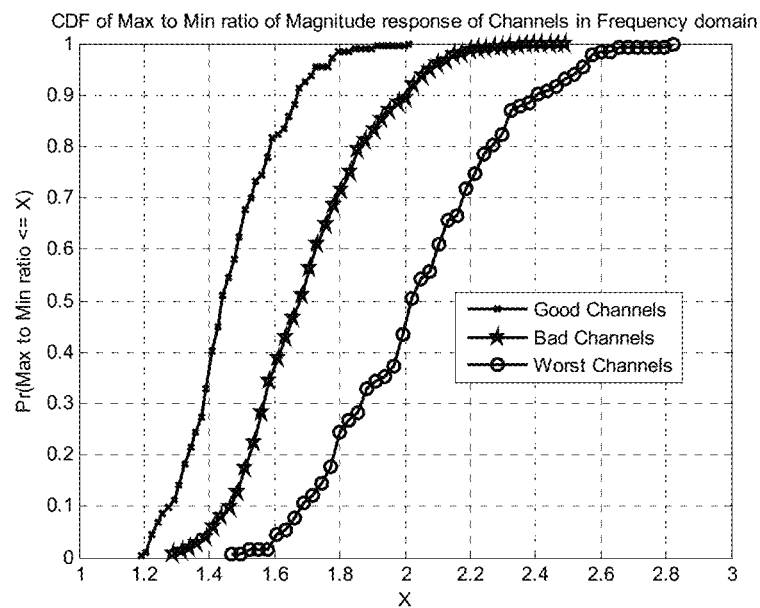
FIG. 9 illustrates the CDF (cumulative distribution function) of observing various max/min magnitudes across subcarriers in the frequency domain representation of the channels, according to an embodiment.

FIG. 9 illustrates the CDF (cumulative distribution function) of observing various max/min magnitudes across sub-carriers in the frequency domain representation of the channels, according to an embodiment. The CDFs are provided for "good", "bad", and "worst" channels. These qualitative terms are analogous to classifying channels as very benign like LOS or AWGN like channels or with lots of dispersion like NLOS channels. As mentioned previously, this classification is useful in determining the SNR required to successfully demodulate a given packet. If that SNR is not exceeded, then the packet may be dropped from further processing to save power.

For FIG. 9, a maximum/minimum threshold of 1.8 could be used to check for a good channel. Over 95% of good channels have a ratio less than this threshold. A threshold of 2.1 could be used to check for a bad channel. If max/min ratio is greater than 2.1, the channel could be classified as a "worst" channel.

Figure 10:
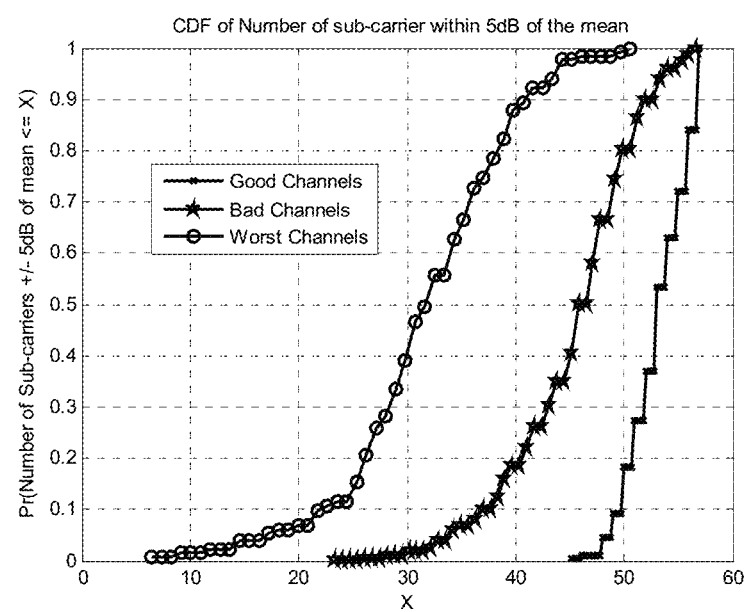
FIG. 10 illustrates CDFs for the different types of channels but for the criteria of number of subcarriers with channel power within 5 dB of the mean power of the channel, according to an embodiment.

FIG. 10 illustrates CDFs for the different types of channels but for the criteria of number of subcarriers with channel power within 5 dB of the mean power of the channel, according to an embodiment. If a count threshold of 50 is used, then if the number of subcarriers within 5 dB is greater than this threshold, then it likely a "good" channel as almost all of the worst channels and most of the bad channels have counts less than this threshold.

Note that a combination of the various metrics (that is, maximum/minimum magnitude ratio, subcarriers within x dB of the mean) can be used to improve the classification accuracy.

Figure 11:
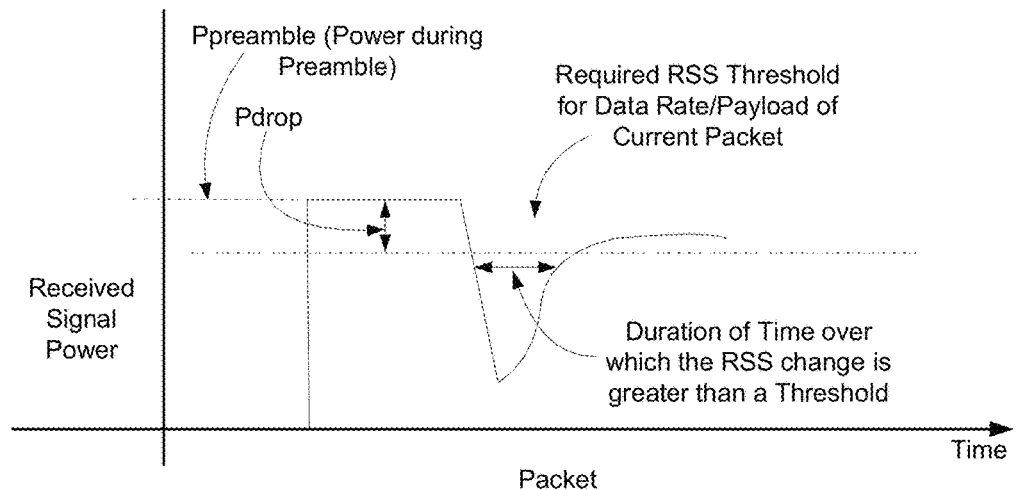
FIG. 11 shows a time-line of a receive packet and a measured received signal strength (RSS) during reception of the packet, according to an embodiment.

FIG. 11 shows a time-line of a receive packet and a measured received signal strength (RSS) during reception of the packet, according to an embodiment. As shown, an embodiment includes determining an RSS of the received packet of the received wireless signal that is required to maintain a particular data rate and payload of the currently received packet. At least some embodiments include monitoring a received signal power of the received wireless signal throughout reception of the packet. Further, a received signal power change of greater than a threshold is detected. Further, for at least some embodiments, it is determined whether the detected change in received signal power will likely result in decoding errors. For example, in the case of an OFDM signal, the RSS can be measured every OFDM symbol. When the measured power is less than the preamble RSS by more than a power decrease threshold, the packet reception can be aborted and portions of the receiver can be shut down. When there is a power decrease, the SNR may drop below the required SNR for the data rate. But, even if the SNR is still greater than the required SNR, the channel estimate may no longer be accurate enough and updates of the channel during the payload may not be fast enough to track the channel change.

The power decrease threshold may be chosen based on the data rate. For example, a lower data rate with more coding may be more tolerant of signal power drop than a higher data rate with a weak code. Similar monitoring can be performed to look for increase in power.

When there is a power increase, the power for each OFDM symbol could be compared against a power increase threshold. Again, the channel estimate may no longer be accurate enough. Additionally, saturation could result at the ADC affecting the signal integrity and effectively degrading the SNR sufficiently to preclude proper decoding. During the AGC (automatic gain control) processing that is performed during the initial portion of the preamble, the RF/analog gain settings are chosen to ensure adequate headroom at the ADC input that results in likelihood of a sample saturating to be less than a saturation probability threshold. When there is a power increase, the amount of increase results in a corresponding decrease in the headroom. A lookup table may be used to determine the new likelihood of saturation. When this likelihood increases beyond an acceptable saturation probability (which can also be a function of the data rate), successful decoding of the packet is no longer possible.

For at least some embodiments, the detected change in received signal power is due to one or more of saturation, an invalid channel estimate or low SNR due to interference. As previously described, the receiver may be shut down when received power change is detected.

For an embodiment, the Monitor the received signal power is monitored throughout the packet. When a power change greater than a threshold is detected, determine whether that will result in likely decoding error due to one or more of saturation, invalid channel estimate, low SNR due to interference.(payload).

FIG. 11 further shows a duration of time in which the RSS change is greater than the threshold. The cause of the RSS change might be some interference. In some cases, if the duration of the interference is short enough, successful decoding may still be possible. If the transmitter uses an interleaver, then the receiver performs the corresponding de-interleaving prior to decoding. Thus, the duration of samples and the corresponding bit confidence levels which are impacted by the interference get distributed in time prior to entering the decoder rather than a contiguous set of values that are degraded. If the duration of the interference is sufficiently less than the length of the interleaving, successful decoding may be possible. Additionally, the acceptable duration of the interference is also dependent on the coding strength. Essentially, all the samples impacted by the interference need to be declared as erasures. Although the interleaver mitigates the problem by spreading out the corrupted samples, if the number of such samples is large over a short interval in comparison with the overhead of a code, the likelihood of decoding error will be quite high. For example, if a ¾ rate convolutional code is used, and the number of samples corrupted by interference is close to the 25% overhead introduced by the code over the span of an OFDM symbol or longer, the likelihood of decoding error is very high.

Figure 12:
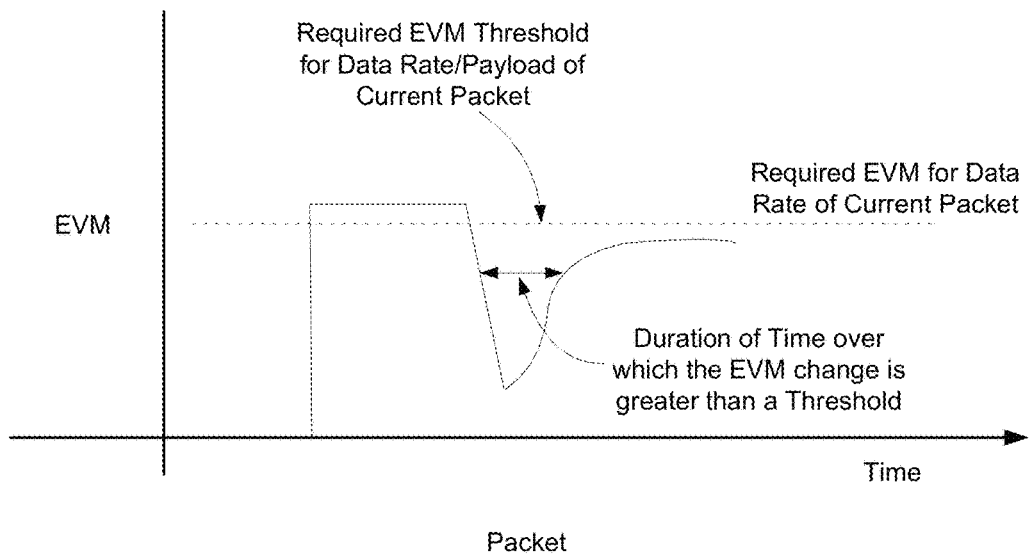
FIG. 12 shows a time-line of a receive packet and a measured error vector magnitude (EVM) during reception of the packet, according to an embodiment.

FIG. 12 shows a time-line of a receive packet and a measured error vector magnitude (EVM) during reception of the packet, according to an embodiment. At least some embodiments include monitoring an error vector magnitude (EVM) of the received signal during processing of the payload. Further it is determined that the packet cannot be decoded with a reliability of greater than the threshold when the EVM drops below a threshold during reception of the packet. While the possible causes of EVM drop may or may not be the same as that of the RSS change discussed previously, it is also likely to cause decoding errors as described with the RSS change. The EVM drop results in poor quality of soft decisions entering the decoder thereby decreasing the decoder's ability to ensure error free decoding.

Figure 13:
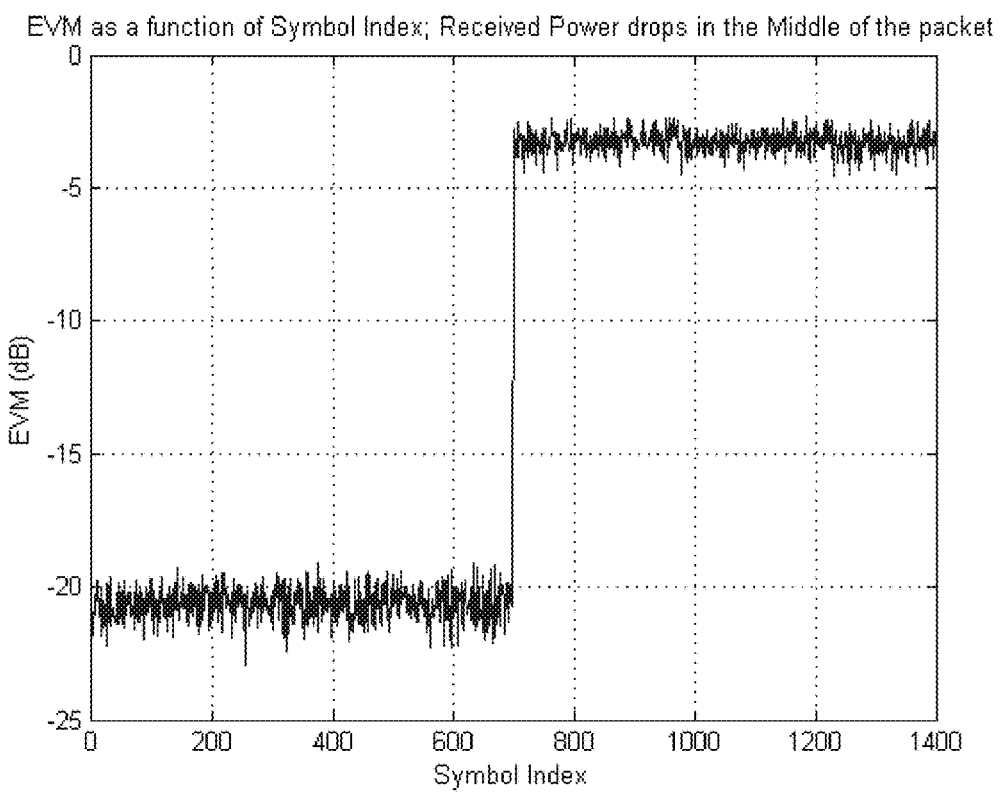
FIG. 13 shows an EVM (error vector magnitude) drop during reception of a packet, according to an embodiment.

FIG. 13 shows an EVM (error vector magnitude) drop during reception of a packet, according to an embodiment. The RSS drops around sample 700 and as shown in the EVM plot, around that sample, the EVM degrades considerably very suddenly. Note in FIG. 13 that while EVM changes from a smaller number to a larger number, the signal quality gets worse since a more negative number reflects better signal quality. More specifically, FIG. 12 treats EVM as a positive number and FIG. 13 treats EVM as a negative number. Both are showing EVM getting worse, but one shows a sudden jump down and the other one up because of the implicit assumption about the sign of EVM.

For at least some embodiments, the drop in the EVM spans a time duration greater than a time threshold. The duration requirements for EVM drop are analogous to those described for the RSS change earlier. In both cases, erasures must be declared corresponding to the soft decisions associated with the samples impacted by the drop in signal quality.

For at least some embodiments, the received signal comprises an OFDM signal. Further, a number of subcarriers of the OFDM signal having an EVM drop below the threshold is monitored. Further, it is determined that the packet cannot be decoded with the reliability of greater than the threshold when the number of subcarriers of the OFDM signal having an EVM drop below the threshold is greater than a count threshold. If the percentage of subcarriers whose EVM drops below an EVM threshold is greater than the overhead of the code used, then the successful decoding is not likely. The EVM threshold should be chosen based on the modulation used to transmit the signal. For instance, a smaller constellation will require a smaller EVM than a larger constellation. If the coding rate is ½, then at least half the subcarriers should be above the EVM threshold. Thus, the count threshold could correspond to half the number of data subcarriers for each OFDM symbol. For at least some embodiments, at least one of the threshold or the count threshold is adaptively selected based on at least one of coding rates or channel characteristics. For at least some embodiments, the drop in the EVM spans a minimum time duration.

Figure 14:
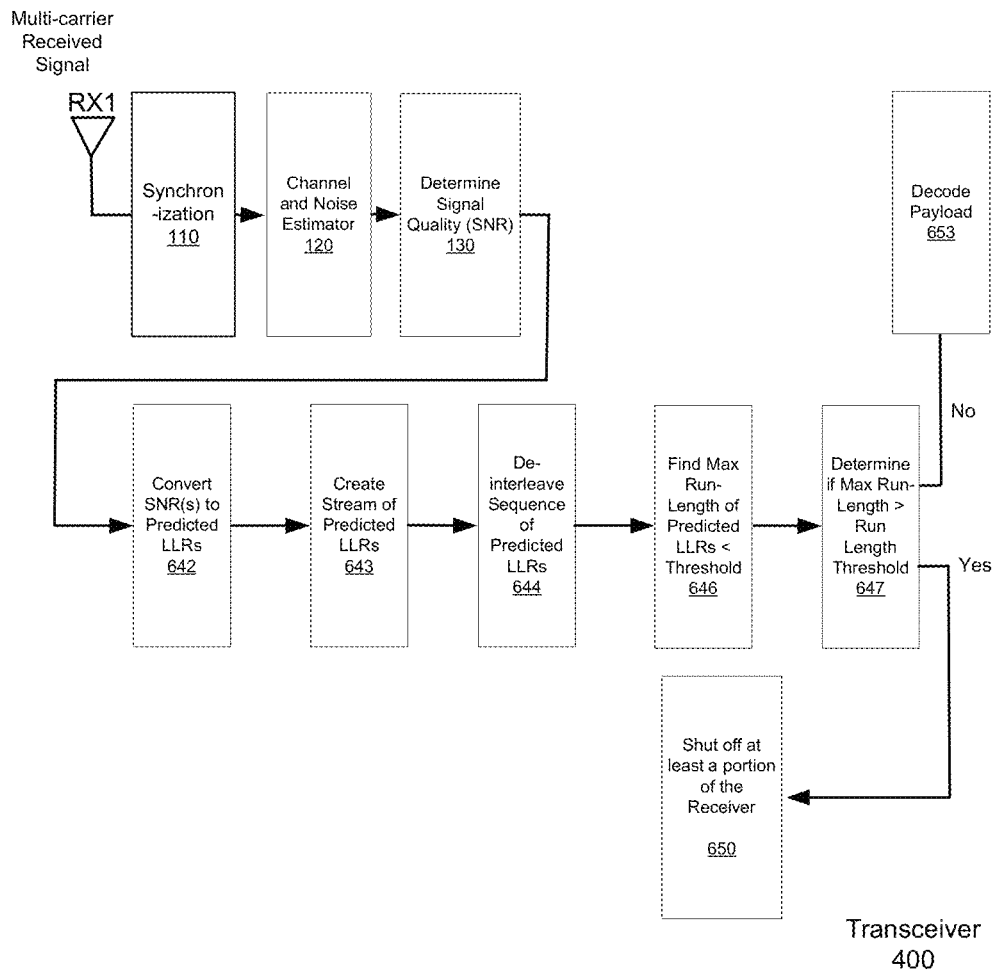
FIG. 14 shows a receiver portion of a transceiver that includes selective deactivating/activating portions of a receiver based on streams of predicted least likelihood ratios (LLR(s)) of the received multicarrier signal, according to an embodiment.

FIG. 14 shows a receiver portion of a transceiver that includes selective deactivating/activating portions of a receiver based on streams of predicted least likelihood ratios (LLR(s)) of the received multicarrier signal, according to an embodiment. For an embodiment, the wireless signal includes an OFDM signal, and the packet includes convolutional encoding. As shown in FIG. 14, the signal quality (SNR) is determined (block 130) is estimated per subcarrier of the preamble. The SNRs are converted (block 642) to predicted LLRs. A stream or a sequence of predicted LLRs (log likelihood ratios) are determined (block 643) based on SNR per subcarrier and modulation used for transmission of the packet. A de-interleaved sequence of the predicted LLRs are constructed (block 644) based on knowledge of the interleaver used during transmission. Further, it is determined (block 647) that the packet cannot be decoded with the reliability of greater than the threshold when a number of contiguous predicted LLRs of the de-interleaved sequence of the predicted LLRs that fall below the threshold is greater than a length threshold (646). Upon the determination that the packet cannot be decoded with the reliability of greater than the threshold, at least some portions of the receiver are turned off (block 650). Otherwise, the payload is decoded (block 653). For at least some embodiments, the length threshold is determined based on a coding strength and properties of a convolution code of the convolutional encoding.

For OFDM signal packets that use convolutional encoding, following the SNR estimation per subcarrier in the preamble, a deinterleaved sequence of predicted LLRs (log likelihood ratios) can be constructed to reflect the confidence level in each bit for a block of bits. The maximum number of contiguous predicted LLRs that fall below a threshold could be compared against the coding strength that is, $d_{min}$) of the convolutional code to determine whether error free decoding is possible.

Figure 15:
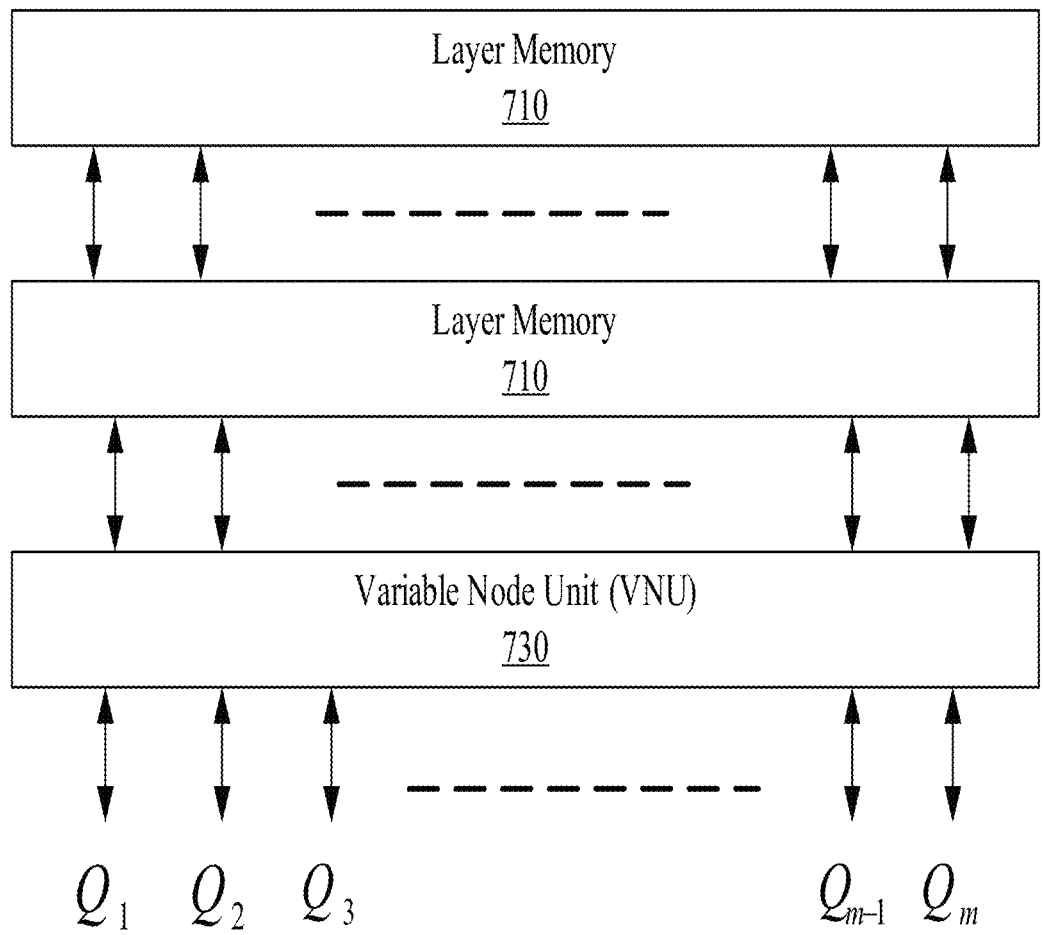
FIG. 15 shows a layered decoder, according to an embodiment.

For at least some embodiments, the wireless signal includes LDPC encoding. Further, the receiver includes LDPC decoding the payload of the packet using a layered decoding. FIG. 15 shows a layered decoder, according to an embodiment. The processing circuitry of the layered decoder includes layered memory 710, a check node unit (CNU) 720, and a variable node unit (VNU) 730.

Further, it is determined that the packet cannot be decoded with the reliability of greater than the threshold when a parity check does not pass after a predetermined number of iteration of the layered decoding. For packets that use LDPC encoding, the packet can be terminated if for a given block, after a certain number of iterations in layered decoding, the parity check does not pass. When the packet is terminated, portions of the receiver may shut off or placed in sleep or standby mode.

Figure 16:
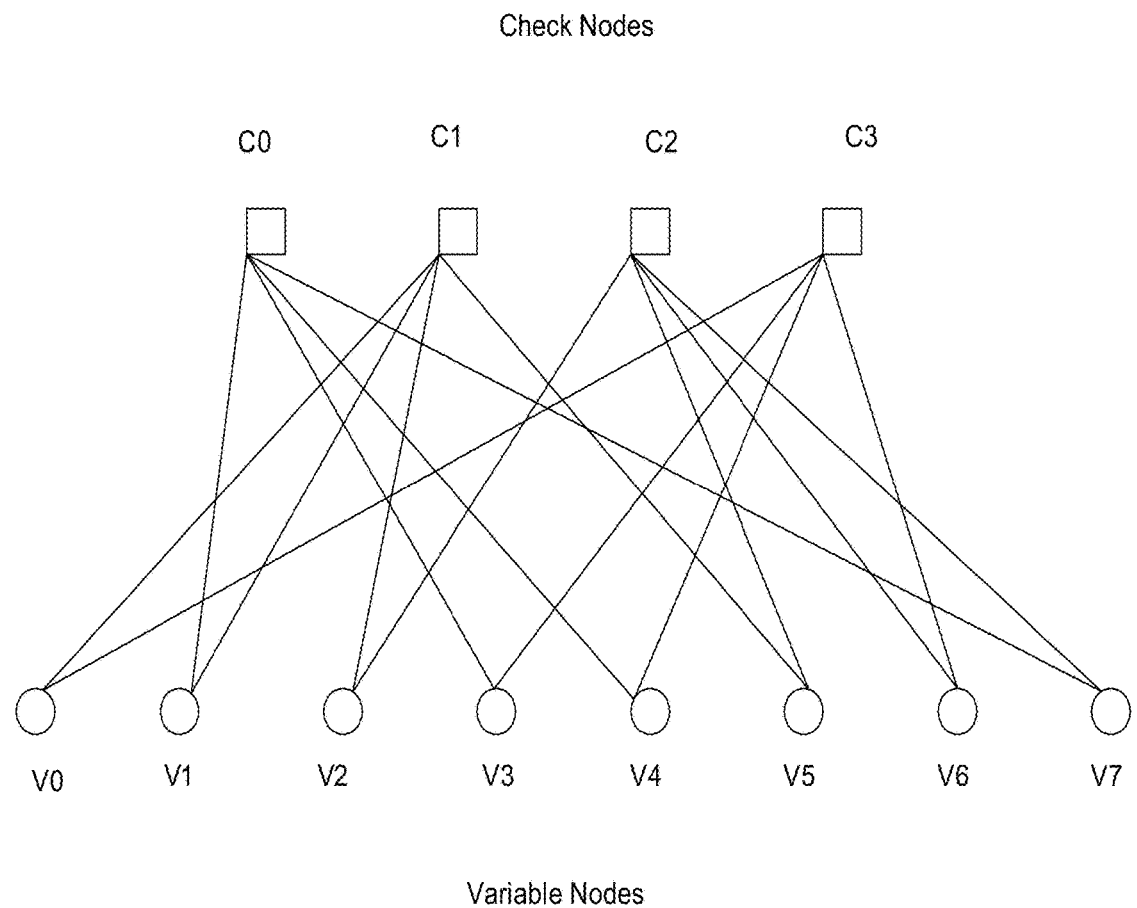
FIG. 16 shows a tanner graph for a parity check matrix that can be utilized for partitioning blocks of n input bit predictive log likelihood ratios (LLRs) to a low-density parity check (LDPC) decoder into a low confidence subset or a high confidence, according to an embodiment.

A better understanding of the described embodiments that utilize predictive LLRs and metrics for node classification in the LDPC decoder can be obtained by closely looking at the structure of the code and the decoding criterion. FIG. 16 shows a tanner graph for a parity check matrix that can be utilized for partitioning blocks of n input bit predictive log likelihood ratios (LLRs) to a low-density parity check (LDPC) decoder into a low confidence subset or a high confidence, according to an embodiment. This Tanner graph provides a graphical representation of an (8, 4) code. In this graph, the nodes of the graph are separated into two distinctive sets, and edges connect nodes of two different types. The two types of nodes a Tanner graph addresses are variable nodes (bit nodes or V-nodes) and check nodes (or C-nodes). Check node, $C_i$ is connected to variable node $V_j$ if the element $h_{ij}$ of the parity check matrix H is a 1. FIG. 16 shows the tanner graph representation for the above parity check matrix, given by H.

$$H = \begin{bmatrix} 0 & 1 & 0 & 1 & 1 & 0 & 0 & 1 \\ 1 & 1 & 1 & 0 & 0 & 1 & 0 & 0 \\ 0 & 0 & 1 & 0 & 0 & 1 & 1 & 1 \\ 1 & 0 & 0 & 1 & 1 & 0 & 1 & 0 \end{bmatrix}$$

Consider the perspective of the graph from bit node, $V_0$. This bit node is connected to 2 check nodes, $C_1$ and $C_3$ and hence bit node $V_0$ takes part in two parity checks and each of these checks involve three other bit nodes. For example, other bit nodes connected to $C_1$ are $V_1$, $V_2$ and $V_5$ and other bit nodes connected to $C_3$ are bit nodes $V_3$, $V_4$ and $V_6$.

The detector that minimizes the probability of error for the n-th bit, $b_n$ calculates a posterior Log-likelihood ratio (LLR), $\lambda_n$ given by, $$\lambda_n = \log \frac{Pr[b_n = 1 \mid r]}{Pr[b_n = 0 \mid r]},$$

where $r=[r_1, r_2, \ldots r_N]$ is the received vector.
The detector decides $\hat{b}_n=1$ if $\lambda_n \geq 0$ and $\hat{b}_n=0$ otherwise. The above can be simplified as $$\lambda_n = \log \frac{f(r_n \mid b_n = 1) \cdot Pr[b_n = 1 \mid \{r_{i \neq n}\}]}{f(r_n \mid b_n = 0) \cdot Pr[b_n = 0 \mid \{r_{i \neq n}\}]}$$

$$= \log \frac{f(r_n \mid b_n = 1)}{f(r_n \mid b_n = 0)} + \log \frac{Pr[b_n = 1 \mid \{r_{i \neq n}\}]}{Pr[b_n = 0 \mid \{r_{i \neq n}\}]}$$

The first term in $\lambda_n$ is called the Intrinsic Information and represents the contribution from the channel observation impacted by the transmitted $b_n$. For convenience, the received sample which is used to determine the LLR for $b_n$ shall be denoted as $r_n$ or equivalently the $n^{th}$ channel observation. The second term represents the contributions from other channel observations apart from the $n^{th}$ observation and is called as the Extrinsic information. Hence the reliability of a particular bit is influenced by both the intrinsic information which is a function of the channel reliability as well as information from other observations.

Assuming that the code bit $b_n$ is involved in exactly j parity checks, numbered 1 through j and say each of the j check nodes involve k−1 other bits.

Letting $b_i=[b_{i,2}, \ldots b_{i,k}]$ denote the set of code bits involved in the $i^{th}$ (i=1 . . . j) parity check excluding the code bit, $b_n$, and letting $\Phi(b)$ denote the parity of a set of bits, b. Then, the j parity check constraints involving code bit $b_n$ ensure that $b_n=\Phi(b_i), \forall i=1 \ldots j$. Hence, the result is:

$$\lambda_n = \log \frac{f(r_n \mid b_n = 1)}{f(r_n \mid b_n = 0)} + \log \frac{Pr[\Phi(b_i) = 1, i = 1 \ldots j \mid \{r_{i \neq n}\}]}{Pr[\Phi(b_i) = 0, i = 1 \ldots j \mid \{r_{i \neq n}\}]}$$

Assuming that the code is cycle free, the vectors, $b_i$, $i=1 \ldots j$ are conditionally independent given as $\{r_{i \neq n}\}$. Hence, the result is:

$$\lambda_n = \log\frac{f(r_n \mid b_n = 1)}{f(r_n \mid b_n = 0)} + \log\frac{\prod_{i=1}^{j} Pr[\Phi(b_i) = 1 \mid \{r_{i \neq 0}\}]}{\prod_{i=1}^{j} Pr[\Phi(b_i) = 0 \mid \{r_{i \neq 0}\}]}$$

$$= \log\frac{f(r_n \mid b_n = 1)}{f(r_n \mid b_n = 0)} + \sum_{i=1}^{j} \log\frac{Pr[\Phi(b_i) = 1 \mid \{r_{i \neq n}\}]}{Pr[\Phi(b_i) = 0 \mid \{r_{i \neq n}\}]}$$

$$= \log\frac{f(r_n \mid b_n = 1)}{f(r_n \mid b_n = 0)} + \sum_{i=1}^{j} \lambda_{\Phi(b_i)}$$

In the above, the extrinsic information (second term) can be interpreted as sum of messages ($\lambda_{\Phi(b_j)}$) from all the check nodes involving code bit $b_n$.

Using the min-sum approximation, the each of the extrinsic information can be approximated as, $$\lambda_{\Phi(b_i)} \approx s_{\Phi(b_j)} |\lambda_{min}(b_i)| \text{ where,}$$

$$s_{\Phi(b_i)} = -\prod_{m=2}^{k} \text{sign}(-\lambda_{i,m})$$

$$|\lambda_{min}(b_i)| = \min_{m=2,\ldots k}(|\lambda_{i,m}|)$$

The structure of the code and the decoding criterion explained in the previous section can be used to distinguish low confidence and high confidence nodes, or in other words less reliable (weaker) and more reliable nodes.

For at least some embodiments, nodes are classified based on the criterion that if a node having less intrinsic reliability is involved in multiple parity checks, then that node dominates the decision of the parity checks and secondly that node affects the extrinsic information of its neighboring bit nodes connected to a common check node. Such a bit node can be considered less reliable.

An example of a procedure for node classification based on the above embodiment includes the following steps. First, for each check node, find the most unreliable bit node with which it is associated, that is, the bit node with the lowest magnitude of the intrinsic information. Second, for every bit node, all the check nodes to which it is connected to are listed. Third, for each of the above check nodes (listed in the second step), check if the most unreliable bit node associated with the check node happens to be the bit node in question (based on the first step). If so, increment a counter specific to that bit node by 1. Fourth, the second step and the third step are repeated for all bit nodes. Fifth, bit nodes are classified as unreliable or bad, which can be denoted as a "weak node", if their associated counter values are greater than a threshold $\Gamma_{M_1}$.

An important application of the bit nodes classification described above is to classify if a channel is good, bad or worst. A channel can be classified as good, bad or worst based on the mean reliabilities of good and bad nodes. Specifically, the ratio of the mean reliabilities of good nodes and those of bad nodes, $\gamma$, can be used as a metric to see if a channel is good or bad.

For example if the above mentioned ratio, $\gamma$ is large for a particular channel instance, then this implies that there are nodes that have very low intrinsic reliabilities compared to the overall mean and hence this could cause a degradation in performance for that channel. The channel could then be classified as bad. Likewise if $\gamma$ small, then it implies similar reliabilities for good and bad nodes, implying a better channel.

Figure 17:
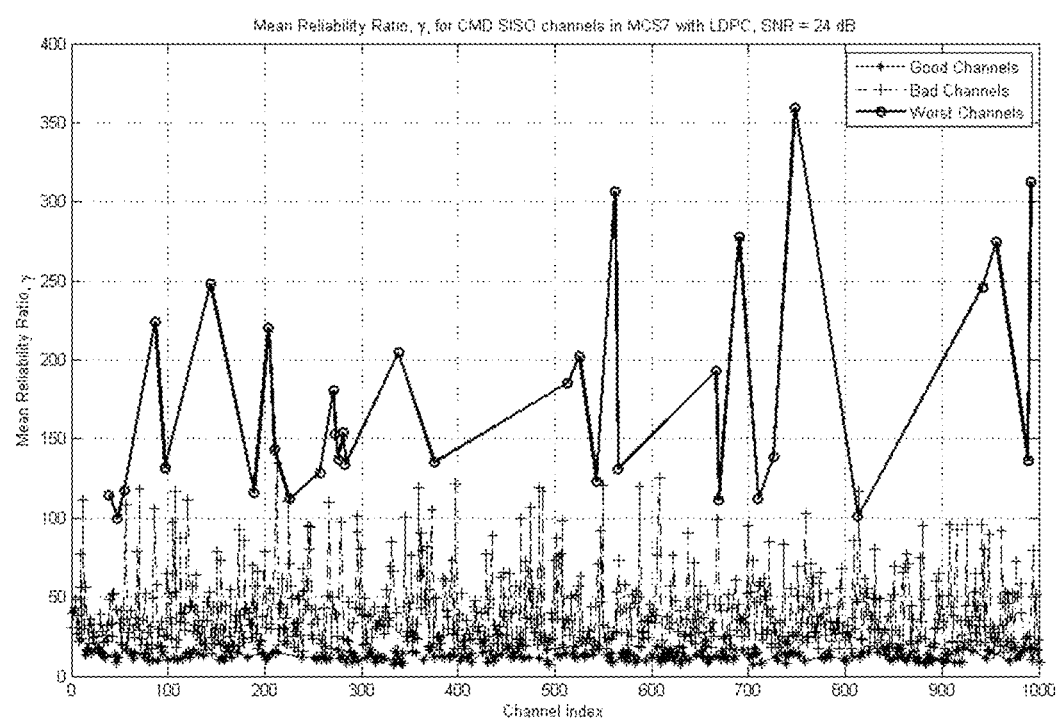
FIG. 17 shows a plot of the mean reliability ratio, $\gamma$ for different CMD channel instances in MCS7, according to an embodiment.

FIG. 17 shows a plot of the mean reliability ratio, $\gamma$ for different CMD channel instances in MCS7, according to an embodiment.

Figure 18:
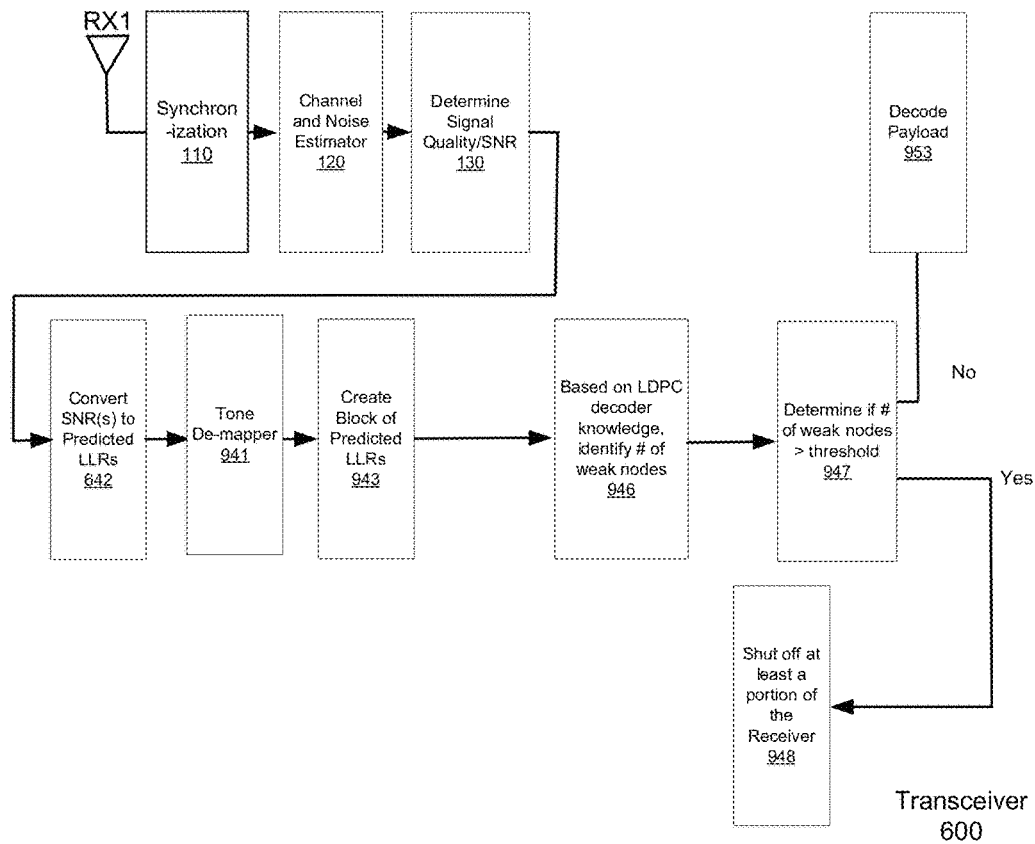
FIG. 18 shows a receiver portion of a transceiver that includes selective deactivating/activating portions of a receiver of a received LDPC encoded signal based weak nodes of an LDPC decoder, according to an embodiment.

FIG. 18 shows a receiver portion of a transceiver that includes selective deactivating/activating portions of a receiver of a received LDPC encoded signal based weak nodes of an LDPC decoder, according to an embodiment. For this embodiment, the predicted LLRs of block 642 are received by a tone de-mapper 941. Blocks of predicted LLRs are created (block 943).

Based on LDPC decoder knowledge, the number of weak nodes is identified (block 946). A determination (block 947) is made as to whether the number of weak nodes is greater or less than a threshold. If greater than the threshold, then at least portions of the receiver are deactivated (block 948). If less than the threshold, then the payload is decoded (block 953).

At least some embodiments include specifying a parity check matrix based on the LDPC encoding. Further, at least some embodiments include generating a set of parity check bits, including multiplying a block of n input bits by the parity check matrix, wherein the input bits and any information associated with the input bits are denoted as a variable nodes, and wherein the parity check bits and any information associated with the parity check bits are denoted as check nodes. Further, at least some embodiments include identifying a number of check nodes connected to a variable node having a node reliability below a node reliability threshold, and determining that the packet cannot be decoded with the reliability of greater than the threshold when the number of check nodes connected to a worst variable node having a node reliability below the node reliability threshold is greater than a weak node number threshold.

Figure 19:
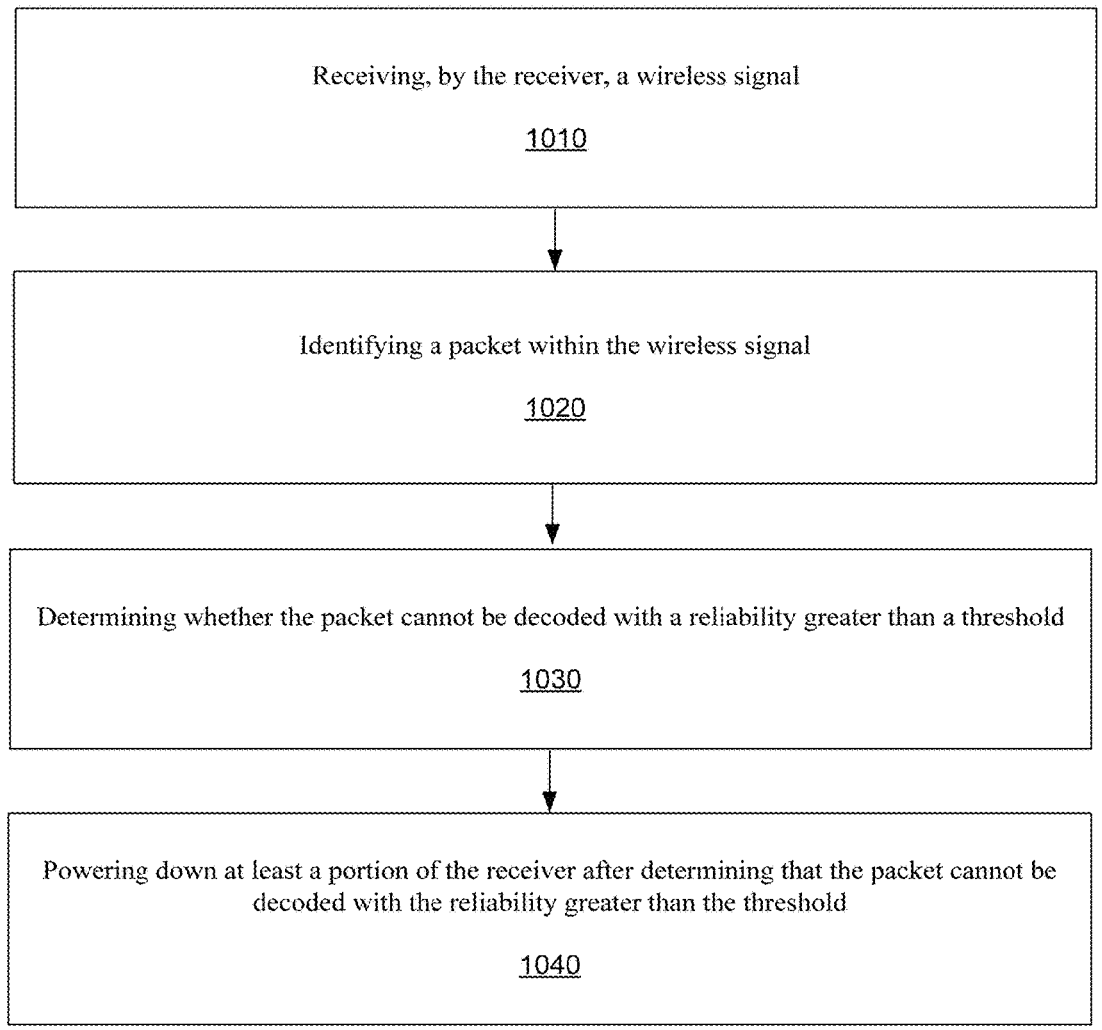
FIG. 19 shows a flowchart that includes steps of methods to power down at least a portion of receiver, according to an embodiment.

FIG. 19 shows a flow chart that includes steps of methods for a receiver selectively processing a received multicarrier signal, according to an embodiment. A first step 1010 includes receiving, by the receiver, a wireless signal. A second step 1020 includes identifying a packet within the wireless signal. A third step 1030 includes determining whether the packet cannot be decoded with a reliability greater than a threshold. A fourth step 1040 includes powering down at least a portion of the receiver after determining that the packet cannot be decoded with the reliability greater than the threshold. For an embodiment, the powering down includes gating a clock to processing circuitry that is used to decode the packet.

For at least some embodiments the at least the portion of the receiver is power down at least until for an expected duration of the packet. For at least some embodiments the at least the portion of the receiver is power down at least until a next packet is expected to be received.

At least some embodiments include identifying the packet further includes identifying a preamble of the packet. For an embodiment, identifying the packet further includes identifying a header of the packet. For an embodiment, identifying the packet further includes identifying a payload of the packet.

At least some embodiments further include decoding a header field of the header during the preamble to determine a data rate and a payload length for a payload portion of the packet, estimating an SNR (signal to noise ratio) for the packet based on preamble fields using channel and noise estimations, and determining whether the estimated SNR is sufficient to allow for decoding of the data rate for the determined payload length.

At least some embodiments further include determining statistics of a channel the wireless signal propagated before being received, and further determining whether the statistics of the channel allow for error free decoding of a specified modulation and the determined payload length.

At least some embodiments further include monitoring a received signal power of the received wireless signal throughout reception of the packet, detecting a received signal power change of greater than a threshold, and determine whether the detected change in received signal power will likely result in decoding errors. For at least some embodiments, the detected change in received signal power is due to one or more of saturation, an invalid channel estimate or low SNR due to interference.

At least some embodiments further include monitoring an error vector magnitude (EVM) of the received signal during processing of the payload, and determining that the packet cannot be decoded with a reliability of greater than the threshold when the EVM drops below a threshold during reception of the packet. For an embodiment, the drop in the EVM spans a time duration greater than a time threshold. For an embodiment, the received signal comprises an OFDM signal, and further including monitoring a number of subcarriers of the OFDM signal having an EVM drop below the threshold, and determining that the packet cannot be decoded with the reliability of greater than the threshold when the number of subcarriers of the OFDM signal having an EVM drop below the threshold is greater than a count threshold. For an embodiment, the drop in the EVM spans a minimum time duration. For an embodiment, at least one of the threshold or the count threshold is adaptively selected based on at least one of coding rates or channel characteristics.

For an embodiment, the packet includes convolutional encoding, and further includes Viterbi decoding the payload, monitoring path metrics during the Viterbi decoding, ad determining that the packet cannot be decoded with the reliability of greater than the threshold when analysis of the path metrics indicates decoding errors.

For an embodiment, the wireless signal includes an OFDM signal, and the packet includes convolutional encoding, and further includes estimating an SNR per subcarrier of the preamble, determining a sequence of predicted LLRs (log likelihood ratios) based on SNR per subcarrier and modulation used for transmission of the packet, constructing a de-interleaved sequence of the predicted LLRs based on knowledge of the interleaver used during transmission, and determining that the packet cannot be decoded with the reliability of greater than the threshold when a number of contiguous predicted LLRs of the de-interleaved sequence of the predicted LLRs that fall below the threshold is greater than a length threshold. For an embodiment, the length threshold is determined based on a coding strength and properties of a convolution code of the convolutional encoding.

For at least some embodiments, wherein a receiver that receives a single carrier modulated signal, Equalization techniques are employed to combat the ISI caused by the channel. The Equalizers typically have a feedforward and a feedback filter whose coefficients are updated adaptively based on an error signal computed as the difference between the input and the output of a decision device (slicer). When the output of the slicer is incorrect, the Equalizer is updated in the wrong direction causing the magnitude of the error signal to increase and could trigger a divergence or saturation of the feedforward and feedback filter coefficients. The divergence or saturation of any of the coefficients is a clear indication of something amiss.

Figure 20:
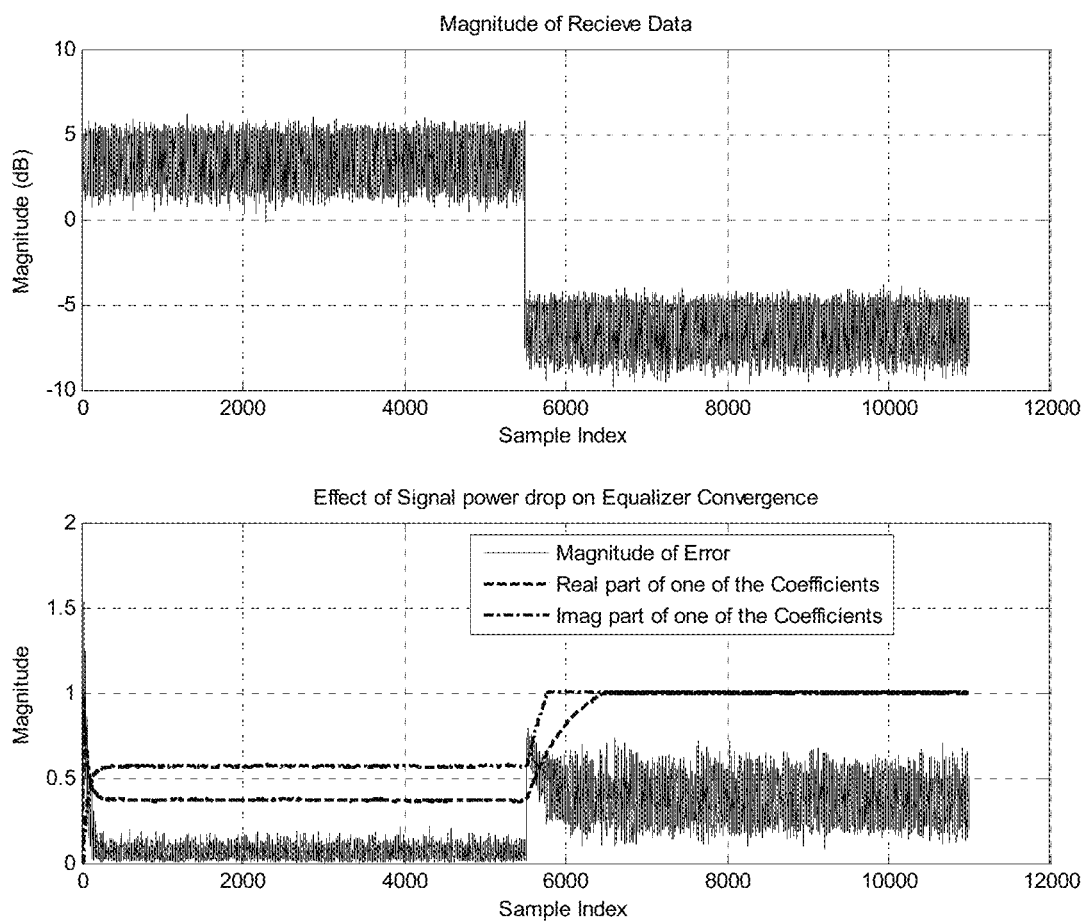
FIG. 20 shows the effect of Equalizer performance with a sudden change in the signal power, according to an embodiment.

FIG. 20 shows the effect of Equalizer performance with a sudden change in the signal power, according to an embodiment. At sample index 5500, the power drops by 10 dB. At this point, the slicer error signal used to update the equalizer coefficients becomes large causing the equalizer coefficients to grow. In the plot, one of the equalizer coefficients is plotted and it starts to grow and saturate at unity owing to fixed point implementation. Notice that the error signal is much larger when compared to the converged case before the power drop. So the divergence or saturation of the equalizer coefficients is an indication of the growth in the error necessitating an abort of further signal processing.

An Alternate Embodiment

As previously described, while the described embodiments include selectively powering down portions of the receiver, an alternate embodiment includes selectively powering up portions of the receiver. That is, portions of the receiver may be activated upon determining that the packet or packets can be decoded with a reliability of greater than a threshold. That is, an embodiment includes receiving, by the receiver, a wireless signal, identifying a packet within the wireless signal, determining whether the packet can be decoded with a reliability greater than a threshold, and powering at least a portion of the receiver after determining that the packet cannot be decoded with the reliability greater than the threshold.

The receivers described herein may be embodied in hardware on an integrated circuit. The receivers described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a receiver configured to perform any of the methods described herein, or to manufacture a receiver comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a receiver will now be described. An integrated circuit (IC) manufacturing system may comprise a layout processing system and an integrated circuit generation system. The IC manufacturing system is configured to receive an IC definition dataset (e.g. defining a receiver as described in any of the examples herein), process the IC definition dataset, and generate an IC according to the IC definition dataset (e.g. which embodies a receiver as described in any of the examples herein). The processing of the IC definition dataset configures the IC manufacturing system to manufacture an integrated circuit embodying a receiver as described in any of the examples herein.

The layout processing system is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimize the circuit layout. When the layout processing system has determined the circuit layout it may output a circuit layout definition to the IC generation system. A circuit layout definition may be, for example, a circuit layout description.

The IC generation system generates an IC according to the circuit layout definition, as is known in the art. For example, the IC generation system may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system may be in the form of computer-readable code which the IC generation system can use to form a suitable mask for use in generating an IC.

The different processes performed by the IC manufacturing system may be implemented all in one location, e.g. by one party. Alternatively, the IC manufacturing system may be a distributed system such that some of the processes may be performed at different locations, and may be performed by different parties. For example, some of the stages of: (i) synthesizing RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a receiver without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above by an integrated circuit manufacturing definition dataset may cause a device as described herein to be manufactured.

In some examples, an integrated circuit definition dataset could include software which runs on hardware defined at the dataset or in combination with hardware defined at the dataset. In the example above, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Although specific embodiments have been described and illustrated, the embodiments are not to be limited to the specific forms or arrangements of parts so described and illustrated. The described embodiments are to only be limited by the claims.

What is claimed:

1. A method of operating a receiver, comprising:
   receiving, by the receiver, a wireless signal;
   identifying a packet within the wireless signal, during a preamble of the packet;
   determining statistics of a channel the wireless signal propagated before being received, wherein the statistics of the channel include at least frequency selectivity of the channel;
   determining whether the packet cannot be decoded with a reliability greater than a threshold, during the preamble of the packet, comprising determining whether the statistics of the channel allow for error free decoding of a specified modulation and a determined payload length; and
   powering down at least a portion of the receiver for at least an expected duration of the packet after determining that the packet cannot be decoded with the reliability greater than the threshold during the preamble of the packet;
   wherein the statistics of the channel further includes at least RMS (root mean square) delay spread of the channel, and wherein determining whether the packet cannot be decoded with a reliability greater than the threshold, during the preamble of the packet further includes determining whether the RMS delay spread of the channel allows for error free decoding of the specified modulation and the determined payload length.

2. The method of claim 1, wherein identifying the packet further includes identifying a header of the packet.

3. The method of claim 2, further comprising:
   decoding a header field of the header during the preamble to determine the data rate and the payload length for a payload portion of the packet;
   estimating an SNR (signal to noise ratio) for the packet during the preamble of the packet; and
   wherein determining whether the packet cannot be decoded with a reliability greater than a threshold further comprises determining whether the estimated SNR is sufficient to allow for decoding of the data rate for the determined payload length of the packet.

4. The method of claim 3, wherein estimating the SNR (signal to noise ratio) for the packet based on preamble fields comprises estimating the SNR (signal to noise ratio) for the packet based on preamble fields using channel and noise estimations.

5. The method of claim 2, further comprising:
   decoding a header field of the header during the preamble to determine the data rate and the payload length for a payload portion of the packet;
   estimating a signal quality for the packet based on preamble fields during the preamble of the packet; and
   wherein determining whether the packet cannot be decoded with a reliability greater than a threshold further comprises determining whether the estimated signal quality is sufficient to allow for decoding of the data rate for the determined payload length of the packet.

6. The method of claim 5, wherein estimating the signal quality for the packet based on preamble fields comprises estimating the signal quality for the packet based on preamble fields using channel and noise estimations.

7. The method of claim 1, wherein identifying the packet further includes identifying a payload of the packet.

8. A receiver, comprising:
   a radio frequency (RF) chain operable to receive a wireless signal;
   signal processing circuitry operative to:
      identify a packet within the wireless signal, during a preamble of the packet;
      determine statistics of a channel the wireless signal propagated before being received, wherein the statistics of the channel include at least frequency selectivity of the channel;
      determine whether the packet cannot be decoded with a reliability greater than a threshold, during the preamble of the packet, comprising determining whether the statistics of the channel allow for error free decoding of a specified modulation and a determined payload length; and wherein
      the receiver is operative to power down at least a portion of the receiver for at least an expected duration of the packet after determining that the packet cannot be decoded with the reliability greater than the threshold during the preamble of the packet;
      wherein the statistics of the channel further includes at least RMS (root mean square) delay spread of the channel, and wherein determining whether the packet cannot be decoded with a reliability greater than the threshold, during the preamble of the packet further includes determining whether the RMS delay spread of the channel allows for error free decoding of the specified modulation and the determined payload length.

9. The receiver of claim 8, wherein the signal processing circuitry is further operative to:
   decode a header field of the header during the preamble to determine the data rate and a payload length for the payload portion of the packet;
   estimate an SNR (signal to noise ratio) for the packet during the preamble of the packet; and
   wherein determining whether the packet cannot be decoded with a reliability greater than a threshold comprises the signal processing circuitry further determining whether the estimated SNR is sufficient to allow for decoding of the data rate for the determined payload length of the packet.

10. The receiver of claim 9, wherein the signal processing circuitry is further operative to:
   estimate the SNR (signal to noise ratio) for the packet based on preamble fields using channel and noise estimations.

11. The receiver of claim 8, wherein the signal processing circuitry is further operative to:
  decode a header field of the header during the preamble to determine ft the data rate and the payload length for a payload portion of the packet;
  estimate a signal quality for the packet based on preamble fields during the preamble of the packet; and
  wherein determining whether the packet cannot be decoded with a reliability greater than a threshold further comprises the signal processing circuitry determining whether the estimated signal quality is sufficient to allow for decoding of the data rate for the determined payload length of the packet.

12. The receiver of claim 11, wherein the signal processing circuitry is further operative to:
  estimate the signal quality for the packet based on preamble fields using channel and noise estimations.

13. A non-transitory computer readable storage medium having stored thereon computer readable instructions that, when executed at a computer system, cause the computer system to perform a method comprising:
  identifying a packet within a received wireless signal, during a preamble of the packet;
  determining statistics of a channel the wireless signal propagated before being received, wherein the statistics of the channel include at least frequency selectivity of the channel and RMS (root mean square) delay spread of the channel;
  determining whether the packet cannot be decoded with a reliability greater than a threshold, during the preamble of the packet, comprising determining whether the statistics of the channel allow for error free decoding of a specified modulation and a determined payload length; and
  powering down at least a portion of the receiver for at least an expected duration of the packet after determining that the packet cannot be decoded with the reliability greater than the threshold during the preamble of the packet;
  wherein the statistics of the channel further includes at least RMS (root mean square) delay spread of the channel, and wherein determining whether the packet cannot be decoded with a reliability greater than the threshold, during the preamble of the packet further includes determining whether the RMS delay spread of the channel allows for error free decoding of the specified modulation and the determined payload length.

14. A method of operating a receiver, comprising:
  receiving, by the receiver, a wireless signal;
  identifying a packet within the wireless signal, during a preamble of the packet;
  determining statistics of a channel the wireless signal propagated before being received, wherein the statistics of the channel include at least frequency selectivity of the channel;
  determining whether the packet cannot be decoded with a reliability greater than a threshold, during the preamble of the packet, comprising determining whether the statistics of the channel allow for error free decoding of a specified modulation and a determined payload length; and
  powering down at least a portion of the receiver for at least an expected duration of the packet after determining that the packet cannot be decoded with the reliability greater than the threshold during the preamble of the packet;
  wherein determining statistics of the channel the wireless signal propagated before being received further comprises characterizing a response of the channel in a frequency domain, and determining a ratio of maximum magnitude to minimum magnitude of the response in the frequency domain, and wherein determining whether the packet cannot be decoded with a reliability greater than the threshold, during the preamble of the packet further includes determining whether the ratio of maximum magnitude to minimum magnitude of the response in the frequency domain allows for error free decoding of the specified modulation and the determined payload length.

15. A method of operating a receiver, comprising:
  receiving, by the receiver, a wireless signal;
  identifying a packet within the wireless signal, during a preamble of the packet;
  determining statistics of a channel the wireless signal propagated before being received, wherein the statistics of the channel include at least frequency selectivity of the channel;
  determining whether the packet cannot be decoded with a reliability greater than a threshold, during the preamble of the packet, comprising determining whether the statistics of the channel allow for error free decoding of a specified modulation and a determined payload length; and
  powering down at least a portion of the receiver for at least an expected duration of the packet after determining that the packet cannot be decoded with the reliability greater than the threshold during the preamble of the packet;
  wherein determining statistics of the channel the wireless signal propagated before being received further comprises characterizing a response of the channel in a frequency domain, and counting a number of carriers of the wireless signals that have a magnitude response within a range of a mean magnitude response of the channel, and wherein determining whether the packet cannot be decoded with a reliability greater than the threshold, during the preamble of the packet further includes determining whether the number of carriers of the wireless signals that have a magnitude response within a range of a mean magnitude response of the channel allows for error free decoding of the specified modulation and the determined payload length.

16. A method of operating a receiver, comprising:
  receiving, by the receiver, a wireless signal;
  identifying a packet within the wireless signal, during a preamble of the packet;
  determining statistics of a channel the wireless signal propagated before being received, wherein the statistics of the channel include at least frequency selectivity of the channel;
  determining whether the packet cannot be decoded with a reliability greater than a threshold, during the preamble of the packet, comprising determining whether the statistics of the channel allow for error free decoding of a specified modulation and a determined payload length; and
  powering down at least a portion of the receiver for at least an expected duration of the packet after determining that the packet cannot be decoded with the reliability greater than the threshold during the preamble of the packet;
  wherein determining statistics of the channel the wireless signal propagated before being received further comprises characterizing a response of the channel in a frequency domain, and determining a CDF (cumulative distribution function) by observing various maximum and minimum magnitudes across the frequency domain of the channel, and wherein determining whether the packet cannot be decoded with a reliability greater than the threshold, during the preamble of the packet further includes determining whether the CDF of the various maximum and minimum magnitudes across the frequency domain of the channel allows for error free decoding of the specified modulation and the determined payload length.

* * * * *